US008966649B2

(12) United States Patent
Stack et al.

(10) Patent No.: US 8,966,649 B2
(45) Date of Patent: *Feb. 24, 2015

(54) SYSTEMS AND METHODS FOR PROVIDING ANONYMIZED USER PROFILE DATA

(71) Applicant: Experian Marketing Solutions, Inc., Schaumberg, IL (US)

(72) Inventors: Brian Stack, Irvine, CA (US); Andrew Lientz, Culver City, CA (US); Simon Chamberlain, Albert Park (AU); Yacine Abdous, Torrance, CA (US); Ray Kahn, Aliso Viejo, CA (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,498

(22) Filed: Jan. 23, 2014

(65) Prior Publication Data
US 2014/0201007 A1    Jul. 17, 2014

Related U.S. Application Data

(63) Continuation of application No. 12/777,998, filed on May 11, 2010, now Pat. No. 8,639,920.

(60) Provisional application No. 61/177,205, filed on May 11, 2009.

(51) Int. Cl.
G06F 21/00    (2013.01)
G06Q 30/02    (2012.01)
G06Q 10/10    (2012.01)

(52) U.S. Cl.
CPC ............ *G06Q 30/0269* (2013.01); *G06Q 10/10* (2013.01); *G06Q 30/02* (2013.01)
USPC .................................. 726/26; 726/17; 726/21

(58) Field of Classification Search
CPC ...................................... G06F 21/10
USPC .............................. 726/17, 21, 26
See application file for complete search history.

(56) References Cited

U.S. PATENT DOCUMENTS 4,775,935 A    10/1988    Yourick
4,982,346 A    1/1991    Girouard et al.
(Continued)

FOREIGN PATENT DOCUMENTS

CN    1290372    5/2001
EP    0 749 081    12/1996
(Continued)

OTHER PUBLICATIONS

BBC Green Home, "My Action Plan", as printed from The Wayback Machine at http://web.archive.org/web/20080513014731/http://www.bbcgreen.com/actionplan, May 13, 2008, pp. 50.
(Continued)

Primary Examiner — Jeffrey Pwu
Assistant Examiner — Thong Truong
(74) Attorney, Agent, or Firm — Knobbe, Martens, Olson & Bear LLP

(57) ABSTRACT

Embodiments facilitate confidential and secure sharing of anonymous user profile data to improve the delivery of customized content. Embodiments of the invention provide a data appliance to an entity such as a business to convert profile data about the business's customers into anonymous identifiers. A similar data appliance is provided to a content provider in one embodiment to generate identifiers for its user profile data. Because the anonymous identifiers are generated with the same anonymization method, identical identifiers are likely generated from profile data of the same users. Therefore, the identifiers can be used to anonymously match the customers of the business to the users of the content provider. Therefore, data can be shared to improve customized content such as advertisements that the business wishes to place with the content provider without requiring the business to disclose customer data in an unencrypted form, and any non-matched data can remain confidential.

20 Claims, 9 Drawing Sheets

(56) References Cited

U.S. PATENT DOCUMENTS

| | | |
|---|---|---|
| 5,201,010 A | 4/1993 | Deaton et al. |
| 5,283,731 A | 2/1994 | Lalonde et al. |
| 5,305,195 A | 4/1994 | Murphy |
| 5,459,306 A | 10/1995 | Stein et al. |
| 5,515,098 A | 5/1996 | Carles |
| 5,590,038 A | 12/1996 | Pitroda |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,640,577 A | 6/1997 | Scharmer |
| 5,649,114 A | 7/1997 | Deaton et al. |
| 5,659,731 A | 8/1997 | Gustafson |
| 5,661,516 A | 8/1997 | Carles |
| 5,692,107 A | 11/1997 | Simoudis et al. |
| 5,724,521 A | 3/1998 | Dedrick |
| 5,740,549 A | 4/1998 | Reilly et al. |
| 5,748,098 A | 5/1998 | Grace |
| 5,754,939 A | 5/1998 | Herz et al. |
| 5,774,868 A | 6/1998 | Cragun et al. |
| 5,774,870 A | 6/1998 | Storey |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,844,218 A | 12/1998 | Kawan et al. |
| 5,848,396 A | 12/1998 | Gerace |
| 5,857,175 A | 1/1999 | Day et al. |
| 5,864,822 A | 1/1999 | Baker, III |
| 5,873,068 A | 2/1999 | Beaumont et al. |
| 5,881,131 A | 3/1999 | Farris et al. |
| 5,944,790 A | 8/1999 | Levy |
| 5,953,707 A | 9/1999 | Huang et al. |
| 5,956,693 A | 9/1999 | Geerlings |
| 5,961,593 A | 10/1999 | Gabber et al. |
| 5,966,695 A | 10/1999 | Melchione et al. |
| 5,974,396 A | 10/1999 | Anderson et al. |
| 5,991,735 A | 11/1999 | Gerace |
| 6,014,688 A | 1/2000 | Venkatraman et al. |
| 6,038,551 A | 3/2000 | Barlow et al. |
| 6,044,357 A | 3/2000 | Garg |
| 6,070,147 A | 5/2000 | Harms et al. |
| 6,073,106 A | 6/2000 | Rozen et al. |
| 6,073,140 A | 6/2000 | Morgan et al. |
| 6,085,169 A | 7/2000 | Walker et al. |
| 6,101,486 A | 8/2000 | Roberts et al. |
| 6,128,602 A | 10/2000 | Northington et al. |
| 6,144,948 A | 11/2000 | Walker et al. |
| 6,157,927 A | 12/2000 | Schaefer et al. |
| 6,178,442 B1 | 1/2001 | Yamazaki |
| 6,202,053 B1 | 3/2001 | Christiansen et al. |
| 6,208,979 B1 | 3/2001 | Sinclair |
| 6,236,977 B1 | 5/2001 | Verba et al. |
| 6,253,202 B1 | 6/2001 | Gilmour |
| 6,289,318 B1 | 9/2001 | Barber |
| 6,298,330 B1 | 10/2001 | Gardenswartz et al. |
| 6,317,752 B1 | 11/2001 | Lee et al. |
| 6,324,566 B1 | 11/2001 | Himmel et al. |
| 6,334,110 B1 | 12/2001 | Walter et al. |
| 6,385,592 B1 | 5/2002 | Angles et al. |
| 6,405,173 B1 | 6/2002 | Honarvar |
| 6,442,577 B1 | 8/2002 | Britton et al. |
| 6,446,200 B1 | 9/2002 | Ball et al. |
| 6,456,979 B1 | 9/2002 | Flagg |
| 6,457,012 B1 | 9/2002 | Jatkowski |
| 6,460,036 B1 | 10/2002 | Herz |
| 6,463,533 B1 | 10/2002 | Calamera et al. |
| 6,505,168 B1 | 1/2003 | Rothman et al. |
| 6,513,018 B1 | 1/2003 | Culhane |
| 6,523,022 B1 | 2/2003 | Hobbs |
| 6,523,041 B1 | 2/2003 | Morgan et al. |
| 6,581,059 B1 | 6/2003 | Barrett et al. |
| 6,601,173 B1 | 7/2003 | Mohler |
| 6,615,247 B1 | 9/2003 | Murphy |
| 6,623,529 B1 | 9/2003 | Lakritz |
| 6,640,215 B1 | 10/2003 | Galperin et al. |
| 6,665,715 B1 | 12/2003 | Houri |
| 6,698,020 B1 | 2/2004 | Zigmond et al. |
| 6,748,426 B1 | 6/2004 | Shaffer et al. |
| 6,754,665 B1 | 6/2004 | Futagami et al. |
| 6,757,740 B1 | 6/2004 | Parekh et al. |
| 6,766,327 B2 | 7/2004 | Morgan, Jr. et al. |
| 6,766,946 B2 | 7/2004 | Iida et al. |
| 6,801,909 B2 | 10/2004 | Delgado et al. |
| 6,804,346 B1 | 10/2004 | Mewhinney |
| 6,810,356 B1 | 10/2004 | Garcia-Franco et al. |
| 6,845,448 B1 | 1/2005 | Chaganti et al. |
| 6,910,624 B1 | 6/2005 | Natsuno |
| 6,925,441 B1 | 8/2005 | Jones, III et al. |
| 6,934,714 B2 | 8/2005 | Meinig |
| 6,950,858 B2 | 9/2005 | Ogami |
| 6,954,757 B2 | 10/2005 | Zargham et al. |
| 6,959,281 B1 | 10/2005 | Freeling et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,993,493 B1 | 1/2006 | Galperin et al. |
| 7,003,792 B1 | 2/2006 | Yuen |
| 7,028,001 B1 | 4/2006 | Muthuswamy et al. |
| 7,033,792 B2 | 4/2006 | Zhong et al. |
| 7,035,855 B1 | 4/2006 | Kilger et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,072,853 B2 | 7/2006 | Shkedi |
| 7,072,963 B2 | 7/2006 | Anderson et al. |
| 7,076,475 B2 | 7/2006 | Honarvar |
| 7,085,734 B2 | 8/2006 | Grant et al. |
| 7,133,935 B2 | 11/2006 | Hedy |
| 7,136,448 B1 | 11/2006 | Venkataperumal et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,167,907 B2 | 1/2007 | Shaffer et al. |
| 7,184,974 B2 | 2/2007 | Shishido |
| 7,185,016 B1 | 2/2007 | Rasmussen |
| 7,185,353 B2 | 2/2007 | Schlack |
| 7,200,602 B2 | 4/2007 | Jonas |
| 7,234,160 B2 | 6/2007 | Vogel et al. |
| 7,246,067 B2 | 7/2007 | Austin et al. |
| 7,249,048 B1 | 7/2007 | O'Flaherty |
| 7,272,591 B1 | 9/2007 | Ghazal et al. |
| 7,275,083 B1 | 9/2007 | Seibel et al. |
| 7,296,734 B2 | 11/2007 | Pliha |
| 7,360,251 B2 | 4/2008 | Spalink et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,383,988 B2 | 6/2008 | Slonecker, Jr. |
| 7,403,942 B1 | 7/2008 | Bayliss |
| 7,421,322 B1 | 9/2008 | Silversmith et al. |
| 7,424,439 B1 | 9/2008 | Fayyad et al. |
| 7,433,864 B2 | 10/2008 | Malik |
| 7,451,113 B1 | 11/2008 | Kasower |
| 7,460,857 B2 | 12/2008 | Roach, Jr. |
| 7,467,401 B2 | 12/2008 | Cicchitto |
| 7,472,088 B2 | 12/2008 | Taylor et al. |
| 7,478,157 B2 | 1/2009 | Bohrer et al. |
| 7,499,868 B2 | 3/2009 | Galperin et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,559,217 B2 | 7/2009 | Bass |
| 7,562,814 B1 | 7/2009 | Shao et al. |
| 7,571,139 B1 | 8/2009 | Giordano et al. |
| 7,580,856 B1 | 8/2009 | Pliha |
| 7,587,366 B2 | 9/2009 | Grim, III et al. |
| 7,590,589 B2 | 9/2009 | Hoffberg |
| 7,596,512 B1 | 9/2009 | Raines et al. |
| 7,596,716 B2 | 9/2009 | Frost et al. |

(56) References Cited

U.S. PATENT DOCUMENTS

| | | |
|---|---|---|
| 7,603,701 B2 | 10/2009 | Gaucas |
| 7,606,725 B2 | 10/2009 | Robertson et al. |
| 7,610,257 B1 | 10/2009 | Abrahams |
| 7,647,344 B2 | 1/2010 | Skurtovich, Jr. et al. |
| 7,653,592 B1 | 1/2010 | Flaxman et al. |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,689,505 B2 | 3/2010 | Kasower |
| 7,698,163 B2 | 4/2010 | Reed et al. |
| 7,698,236 B2 | 4/2010 | Cox et al. |
| 7,698,445 B2 | 4/2010 | Fitzpatrick et al. |
| 7,707,059 B2 | 4/2010 | Reed et al. |
| 7,711,635 B2 | 5/2010 | Steele et al. |
| 7,711,636 B2 | 5/2010 | Robida et al. |
| 7,725,300 B2 | 5/2010 | Pinto et al. |
| 7,730,509 B2 | 6/2010 | Boulet et al. |
| 7,739,139 B2 | 6/2010 | Robertson et al. |
| 7,742,982 B2 | 6/2010 | Chaudhuri et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,765,311 B2 | 7/2010 | Itabashi et al. |
| 7,769,696 B2 | 8/2010 | Yoda |
| 7,774,270 B1 | 8/2010 | MacCloskey |
| 7,788,147 B2 | 8/2010 | Haggerty et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,814,005 B2 | 10/2010 | Imrey et al. |
| 7,818,228 B1 | 10/2010 | Coulter |
| 7,841,008 B1 | 11/2010 | Cole et al. |
| 7,849,004 B2 | 12/2010 | Choudhuri et al. |
| 7,860,786 B2 | 12/2010 | Blackburn et al. |
| 7,925,549 B2 | 4/2011 | Looney et al. |
| 7,930,242 B2 | 4/2011 | Morris et al. |
| 7,962,404 B1 | 6/2011 | Metzger, II et al. |
| 7,974,860 B1 | 7/2011 | Travis |
| 7,983,932 B2 | 7/2011 | Kane |
| 7,991,689 B1 | 8/2011 | Brunzell et al. |
| 7,991,901 B2 | 8/2011 | Tarquini et al. |
| 7,996,521 B2 | 8/2011 | Chamberlain et al. |
| 7,996,912 B2 | 8/2011 | Spalink et al. |
| 8,001,042 B1 | 8/2011 | Brunzell et al. |
| 8,005,759 B2 | 8/2011 | Hirtenstein et al. |
| 8,015,045 B2 | 9/2011 | Galperin et al. |
| 8,024,264 B2 | 9/2011 | Chaudhuri et al. |
| 8,027,871 B2 | 9/2011 | Willams et al. |
| 8,036,979 B1 | 10/2011 | Torrez et al. |
| 8,065,233 B2 | 11/2011 | Lee et al. |
| 8,078,453 B2 | 12/2011 | Shaw |
| 8,078,528 B1 | 12/2011 | Vicente et al. |
| 8,086,524 B1 | 12/2011 | Craig et al. |
| 8,095,443 B2 | 1/2012 | DeBie |
| 8,095,458 B2 | 1/2012 | Peterson et al. |
| 8,099,341 B2 | 1/2012 | Varghese |
| 8,099,356 B2 | 1/2012 | Feinstein et al. |
| 8,126,805 B2 | 2/2012 | Sulkowski et al. |
| 8,127,986 B1 | 3/2012 | Taylor et al. |
| 8,135,607 B2 | 3/2012 | Williams et al. |
| 8,145,754 B2 | 3/2012 | Chamberlain et al. |
| 8,161,104 B2 | 4/2012 | Tomkow |
| 8,175,889 B1 | 5/2012 | Girulat et al. |
| 8,234,498 B2 | 7/2012 | Britti et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,290,840 B2 | 10/2012 | Kasower |
| 8,296,229 B1 | 10/2012 | Yellin et al. |
| 8,301,574 B2 | 10/2012 | Kilger et al. |
| 8,312,033 B1 | 11/2012 | McMillan |
| 8,315,943 B2 | 11/2012 | Torrez et al. |
| 8,321,952 B2 | 11/2012 | Spalink et al. |
| 8,386,377 B1 | 2/2013 | Xiong et al. |
| 8,392,334 B2 | 3/2013 | Hirtenstein et al. |
| 8,463,919 B2 | 6/2013 | Tarquini et al. |
| 8,478,674 B1 | 7/2013 | Kapczynski et al. |
| 8,515,828 B1 | 8/2013 | Wolf et al. |
| 8,533,322 B2 | 9/2013 | Chamberlain et al. |
| 8,560,434 B2 | 10/2013 | Morris et al. |
| 8,560,666 B2 | 10/2013 | Low |
| 8,572,083 B1 | 10/2013 | Snell et al. |
| 8,606,626 B1 | 12/2013 | DeSoto et al. |
| 8,606,666 B1 | 12/2013 | Courbage et al. |
| 8,626,563 B2 | 1/2014 | Williams et al. |
| 8,626,646 B2 | 1/2014 | Torrez et al. |
| 8,639,616 B1 | 1/2014 | Rolenaitis et al. |
| 8,639,920 B2 | 1/2014 | Stack et al. |
| 8,732,004 B1 | 5/2014 | Ramos et al. |
| 8,738,515 B2 | 5/2014 | Chaudhuri et al. |
| 8,738,516 B1 | 5/2014 | Dean et al. |
| 2001/0011245 A1 | 8/2001 | Duhon |
| 2001/0014868 A1 | 8/2001 | Herz et al. |
| 2001/0049620 A1 | 12/2001 | Blasko |
| 2002/0004736 A1 | 1/2002 | Roundtree et al. |
| 2002/0023051 A1 | 2/2002 | Kunzle et al. |
| 2002/0026507 A1 | 2/2002 | Sears et al. |
| 2002/0026519 A1 | 2/2002 | Itabashi et al. |
| 2002/0035684 A1 | 3/2002 | Vogel et al. |
| 2002/0046099 A1 | 4/2002 | Frengut et al. |
| 2002/0049968 A1 | 4/2002 | Wilson et al. |
| 2002/0055906 A1 | 5/2002 | Katz et al. |
| 2002/0069122 A1 | 6/2002 | Yun et al. |
| 2002/0077964 A1 | 6/2002 | Brody et al. |
| 2002/0082892 A1 | 6/2002 | Raffel et al. |
| 2002/0091650 A1 | 7/2002 | Ellis |
| 2002/0099628 A1 | 7/2002 | Takaoka et al. |
| 2002/0099824 A1 | 7/2002 | Bender et al. |
| 2002/0103809 A1 | 8/2002 | Starzl et al. |
| 2002/0111910 A1 | 8/2002 | Walsh |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133404 A1 | 9/2002 | Pedersen |
| 2002/0133504 A1 | 9/2002 | Vlahos et al. |
| 2002/0147669 A1 | 10/2002 | Taylor et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0018578 A1 | 1/2003 | Schultz |
| 2003/0023489 A1 | 1/2003 | McGuire et al. |
| 2003/0033242 A1 | 2/2003 | Lynch et al. |
| 2003/0041050 A1 | 2/2003 | Smith et al. |
| 2003/0046222 A1 | 3/2003 | Bard et al. |
| 2003/0065563 A1 | 4/2003 | Elliott et al. |
| 2003/0069839 A1 | 4/2003 | Whittington et al. |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0229892 A1 | 12/2003 | Sardera |
| 2003/0233278 A1 | 12/2003 | Marshall |
| 2003/0233323 A1 | 12/2003 | Bilski et al. |
| 2004/0006488 A1 | 1/2004 | Fitall et al. |
| 2004/0010458 A1 | 1/2004 | Friedman |
| 2004/0030667 A1 | 2/2004 | Xu et al. |
| 2004/0039688 A1 | 2/2004 | Sulkowski et al. |
| 2004/0062213 A1 | 4/2004 | Koss |
| 2004/0078809 A1 | 4/2004 | Drazin |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107125 A1 | 6/2004 | Guheen et al. |

(56) References Cited

U.S. PATENT DOCUMENTS

| | | |
|---|---|---|
| 2004/0111359 A1 | 6/2004 | Hudock |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128193 A1 | 7/2004 | Brice et al. |
| 2004/0128236 A1 | 7/2004 | Brown et al. |
| 2004/0139025 A1 | 7/2004 | Coleman |
| 2004/0153330 A1 | 8/2004 | Miller et al. |
| 2004/0153521 A1 | 8/2004 | Kogo |
| 2004/0163101 A1 | 8/2004 | Swix et al. |
| 2004/0199456 A1 | 10/2004 | Flint et al. |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0225594 A1 | 11/2004 | Nolan, III et al. |
| 2005/0005168 A1 | 1/2005 | Dick |
| 2005/0010555 A1 | 1/2005 | Gallivan |
| 2005/0021397 A1 | 1/2005 | Cui et al. |
| 2005/0021963 A1 | 1/2005 | Tomkow |
| 2005/0027995 A1 | 2/2005 | Menschik et al. |
| 2005/0049991 A1 | 3/2005 | Aggarwal |
| 2005/0050027 A1 | 3/2005 | Yeh et al. |
| 2005/0055231 A1 | 3/2005 | Lee |
| 2005/0091164 A1 | 4/2005 | Varble |
| 2005/0144067 A1 | 6/2005 | Farahat et al. |
| 2005/0192008 A1 | 9/2005 | Desai et al. |
| 2005/0204381 A1 | 9/2005 | Ludvig et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0246338 A1 | 11/2005 | Bird |
| 2005/0251820 A1 | 11/2005 | Stefanik et al. |
| 2005/0278743 A1 | 12/2005 | Flickinger et al. |
| 2005/0288954 A1 | 12/2005 | McCarthy et al. |
| 2005/0288998 A1 | 12/2005 | Verma et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0074991 A1 | 4/2006 | Lussier et al. |
| 2006/0080233 A1 | 4/2006 | Mendelovich et al. |
| 2006/0080251 A1 | 4/2006 | Fried et al. |
| 2006/0085454 A1 | 4/2006 | Blegen et al. |
| 2006/0122921 A1 | 6/2006 | Comerford et al. |
| 2006/0155573 A1 | 7/2006 | Hartunian |
| 2006/0184440 A1 | 8/2006 | Britti et al. |
| 2006/0195866 A1 | 8/2006 | Thukral |
| 2006/0206379 A1 | 9/2006 | Rosenberg |
| 2006/0212353 A1 | 9/2006 | Roslov et al. |
| 2006/0224696 A1 | 10/2006 | King et al. |
| 2006/0229943 A1 | 10/2006 | Mathias et al. |
| 2006/0230415 A1 | 10/2006 | Roeding |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253323 A1 | 11/2006 | Phan et al. |
| 2006/0259364 A1 | 11/2006 | Strock et al. |
| 2006/0271472 A1 | 11/2006 | Cagan |
| 2006/0277092 A1 | 12/2006 | Williams |
| 2006/0282359 A1 | 12/2006 | Nobili et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0016518 A1 | 1/2007 | Atkinson et al. |
| 2007/0022032 A1 | 1/2007 | Anderson et al. |
| 2007/0022141 A1 | 1/2007 | Singleton et al. |
| 2007/0022297 A1 | 1/2007 | Britti et al. |
| 2007/0033227 A1 | 2/2007 | Gaito et al. |
| 2007/0038483 A1 | 2/2007 | Wood |
| 2007/0038497 A1 | 2/2007 | Britti et al. |
| 2007/0038516 A1 | 2/2007 | Apple et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0118393 A1 | 5/2007 | Rosen et al. |
| 2007/0124235 A1 | 5/2007 | Chakraborty et al. |
| 2007/0130070 A1 | 6/2007 | Williams |
| 2007/0156515 A1 | 7/2007 | Hasselback et al. |
| 2007/0156554 A1 | 7/2007 | Nikoley et al. |
| 2007/0156589 A1 * | 7/2007 | Zimler et al. .................. 705/51 |
| 2007/0157110 A1 | 7/2007 | Gandhi et al. |
| 2007/0168246 A1 | 7/2007 | Haggerty et al. |
| 2007/0169189 A1 | 7/2007 | Crespo et al. |
| 2007/0174122 A1 | 7/2007 | Howard et al. |
| 2007/0185797 A1 | 8/2007 | Robinson |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0208640 A1 | 9/2007 | Banasiak et al. |
| 2007/0208729 A1 | 9/2007 | Martino |
| 2007/0220553 A1 | 9/2007 | Branam et al. |
| 2007/0220611 A1 | 9/2007 | Socolow et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0250459 A1 | 10/2007 | Schwarz et al. |
| 2007/0261114 A1 | 11/2007 | Pomerantsev |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288360 A1 | 12/2007 | Seeklus |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0299759 A1 | 12/2007 | Kelly |
| 2007/0299771 A1 | 12/2007 | Brody |
| 2008/0005313 A1 | 1/2008 | Flake et al. |
| 2008/0010206 A1 | 1/2008 | Coleman |
| 2008/0021802 A1 | 1/2008 | Pendleton |
| 2008/0028067 A1 | 1/2008 | Berkhin et al. |
| 2008/0033742 A1 | 2/2008 | Bernasconi |
| 2008/0046383 A1 | 2/2008 | Hirtenstein et al. |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097928 A1 | 4/2008 | Paulson |
| 2008/0109875 A1 | 5/2008 | Kraft |
| 2008/0115191 A1 | 5/2008 | Kim et al. |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0172324 A1 | 7/2008 | Johnson |
| 2008/0177655 A1 | 7/2008 | Zalik |
| 2008/0177836 A1 | 7/2008 | Bennett |
| 2008/0183504 A1 | 7/2008 | Highley |
| 2008/0183564 A1 | 7/2008 | Tien et al. |
| 2008/0184289 A1 | 7/2008 | Cristofalo et al. |
| 2008/0205655 A1 | 8/2008 | Wilkins et al. |
| 2008/0208873 A1 | 8/2008 | Boehmer |
| 2008/0215470 A1 | 9/2008 | Sengupta et al. |
| 2008/0221970 A1 | 9/2008 | Megdal et al. |
| 2008/0221990 A1 | 9/2008 | Megdal et al. |
| 2008/0228556 A1 | 9/2008 | Megdal et al. |
| 2008/0228635 A1 | 9/2008 | Megdal et al. |
| 2008/0255897 A1 | 10/2008 | Megdal et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0294540 A1 | 11/2008 | Celka et al. |

(56) References Cited

U.S. PATENT DOCUMENTS

| | | |
|---|---|---|
| 2008/0301016 A1 | 12/2008 | Durvasula et al. |
| 2008/0301727 A1 | 12/2008 | Cristofalo et al. |
| 2008/0306750 A1 | 12/2008 | Wunder et al. |
| 2009/0006475 A1 | 1/2009 | Udezue et al. |
| 2009/0018996 A1 | 1/2009 | Hunt et al. |
| 2009/0024505 A1 | 1/2009 | Patel et al. |
| 2009/0031426 A1 | 1/2009 | Dal Lago et al. |
| 2009/0043691 A1 | 2/2009 | Kasower |
| 2009/0044246 A1 | 2/2009 | Sheehan et al. |
| 2009/0055894 A1 | 2/2009 | Lorsch |
| 2009/0060343 A1 | 3/2009 | Rosca |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0094674 A1 | 4/2009 | Schwartz et al. |
| 2009/0112650 A1 | 4/2009 | Iwane |
| 2009/0133058 A1 | 5/2009 | Kouritzin et al. |
| 2009/0138335 A1 | 5/2009 | Lieberman |
| 2009/0144102 A1 | 6/2009 | Lopez |
| 2009/0144201 A1 | 6/2009 | Gierkink et al. |
| 2009/0150166 A1 | 6/2009 | Leite et al. |
| 2009/0150238 A1 | 6/2009 | Marsh et al. |
| 2009/0164380 A1 | 6/2009 | Brown |
| 2009/0177480 A1 | 7/2009 | Chen et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0271248 A1 | 10/2009 | Sherman et al. |
| 2009/0276233 A1 | 11/2009 | Brimhall et al. |
| 2009/0288109 A1 | 11/2009 | Downey et al. |
| 2009/0313163 A1 | 12/2009 | Wang et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0023434 A1 | 1/2010 | Bond |
| 2010/0037255 A1 | 2/2010 | Sheehan et al. |
| 2010/0049803 A1 | 2/2010 | Ogilvie et al. |
| 2010/0094758 A1 | 4/2010 | Chamberlain et al. |
| 2010/0138290 A1 | 6/2010 | Zschocke et al. |
| 2010/0145840 A1 | 6/2010 | Kasower |
| 2010/0169159 A1 | 7/2010 | Rose et al. |
| 2010/0169264 A1 | 7/2010 | O'Sullivan |
| 2010/0217837 A1 | 8/2010 | Ansari et al. |
| 2010/0250434 A1 | 9/2010 | Megdal et al. |
| 2010/0250497 A1 | 9/2010 | Redlich et al. |
| 2010/0268660 A1 | 10/2010 | Ekdahl |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0047071 A1 | 2/2011 | Choudhuri et al. |
| 2011/0071950 A1 | 3/2011 | Ivanovic |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0126275 A1 | 5/2011 | Anderson et al. |
| 2011/0137760 A1 | 6/2011 | Rudie et al. |
| 2011/0137789 A1 | 6/2011 | Kortina et al. |
| 2011/0145122 A1 | 6/2011 | Haggerty et al. |
| 2011/0164746 A1 | 7/2011 | Nice et al. |
| 2011/0178899 A1 | 7/2011 | Huszar |
| 2011/0184838 A1 | 7/2011 | Winters et al. |
| 2011/0213641 A1 | 9/2011 | Metzger, II et al. |
| 2011/0219421 A1 | 9/2011 | Ullman et al. |
| 2011/0251946 A1 | 10/2011 | Haggerty et al. |
| 2011/0270618 A1 | 11/2011 | Banerjee et al. |
| 2011/0307397 A1 | 12/2011 | Benmbarek |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0095927 A1 | 4/2012 | Hirtenstein et al. |
| 2012/0110677 A1 | 5/2012 | Abendroth et al. |
| 2012/0136763 A1 | 5/2012 | Megdal et al. |
| 2012/0136774 A1 | 5/2012 | Imrey et al. |
| 2012/0158574 A1 | 6/2012 | Brunzell et al. |
| 2012/0265607 A1 | 10/2012 | Belwadi |
| 2012/0290660 A1 | 11/2012 | Rao et al. |
| 2013/0132151 A1 | 5/2013 | Stibel et al. |
| 2013/0173481 A1 | 7/2013 | Hirtenstein et al. |
| 2013/0218638 A1 | 8/2013 | Kilger et al. |
| 2013/0218751 A1 | 8/2013 | Chaudhuri et al. |
| 2014/0025815 A1 | 1/2014 | Low |
| 2014/0032265 A1 | 1/2014 | Paprocki et al. |

FOREIGN PATENT DOCUMENTS

| | | |
|---|---|---|
| EP | 1 122 664 | 8/2001 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 91/03789 | 3/1991 |
| WO | WO 97/23838 | 7/1997 |
| WO | WO 98/49643 | 11/1998 |
| WO | WO 99/04350 | 1/1999 |
| WO | WO 99/22328 | 5/1999 |
| WO | WO 00/55789 | 9/2000 |
| WO | WO 00/55790 | 9/2000 |
| WO | WO 01/10090 | 2/2001 |
| WO | WO 01/11522 | 2/2001 |
| WO | WO 01/25896 | 4/2001 |
| WO | WO 01/75754 | 10/2001 |
| WO | WO 01/84281 | 11/2001 |
| WO | WO 03/101123 | 12/2003 |
| WO | WO 2004/114160 | 12/2004 |
| WO | WO 2007/149941 | 12/2007 |
| WO | WO 2008/022289 | 2/2008 |
| WO | WO 2008/054403 | 5/2008 |
| WO | WO 2008/076343 | 6/2008 |
| WO | WO 2008/147918 | 12/2008 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |

OTHER PUBLICATIONS

Berr: Department for Business Enterprise & Regulatory Reform, "Regional Energy Consumption Statistics", Jun. 10, 2008, http://

(56) References Cited

OTHER PUBLICATIONS webarchive.nationalarchives.gov.uk/20080610182444/http://www.berr.gov.uk/energy/statistics/regional/index.html.
Buxfer, http://www.buxfer.com/ printed Feb. 5, 2014 in 1 page.
"Carbon Calculator—Calculation Explanation," Warwick University Carbon Footprint Project Group, 2005, pp. 5, http://www.carboncalculator.co.uk/explanation.php.
Check, http://check.me/ printed Feb. 5, 2014 in 3 pages.
"Debt Settlement: Watch Video on how to Pay Your Debt Faster", http://www.debtconsolidationcare.com/debt-settlement.html printed Jan. 9, 2013 in 6 pages.
Energy Saving TrustTM, "HEED Online User Manual (1.7)", Jul. 24, 2008, pp. 18, www.energysavingtrust.org.uk, Jul. 24, 2008.
Fisher, Joseph, "Access to Fair Credit Reports: Current Practices and Proposed Legislation," American Business Law Journal, Fall 1981, vol. 19, No. 3, p. 319.
Jowit, Juliette, "Ever wondered how big your own carbon footprint might be?", Nov. 4, 2007, pp. 4, http://www.guardian.co.uk/money/2007/nov/04/cash.carbonfootprints/print.
Manilla, http://www.manilla.com/how-it-works/ printed Feb. 5, 2014 in 1 page.
Mint.com, http://www.mint.com/how-it-works/ printed Feb. 5, 2013 in 2 pages.
Mvelopes, http://www.mvelopes.com/ printed Feb. 5, 2014 in 2 pages.
PersonalCapital.com, http://www.personalcapital.com/how-it-works printed Feb. 5, 2014 in 5 pages.
"Qualifying for Debt Settlement", http://www.certifieddebt.com/debt/settlement-qualifications.shtml printed Jan. 9, 2013 in 2 pages.
"Resolve Debt for Less: With Help from Freedom Financial" http://www.debtsettlementusa.com/ printed Jan. 9, 2013 in 6 pages.
"Settling Your Debts—Part 1 in Our Debt Settlement Series", http://www.creditinfocenter.com/debt/settle_debts.shtml printed Jan. 9, 2013 in 6 pages.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
"Atlas on Demand, Concurrent, and Everstream Strike Video-On-Demand Advertising Alliance", www.atlassolutions.com, Jul. 13, 2006, 3 pages.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas on Demand and C-COR Join Forces to Offer Advertising Management Solution for On Demand TV: Global Provider of On Demand Systems Partners with Atlas to Develop and Market Comprehensive VOD Advertising Solution," www.atlassolutions.com, Jul. 25, 2005, 3 pages.
"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.

Adzilla, Press Release, "ZILLACASTING Technology Approved and Patent Pending," http://www.adzilla.com/newsroom/pdf/patent_051605.pdf, May 16, 2005, pp. 2.
AFX New Limited—AFX International Focus, "Nielsen moving to measure off-TV viewing," Jun. 14, 2006, 1 page.
Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
"Cable Solution Now, The Industry Standard for Information Management: Strata's tim.net Crosses Important Threshold Dominant Solution for All Top 20 TV Markets," stratag.com, Apr. 28, 2006, 1 page, http://stratag.com/news/cablepress042806.html.
Caliendo, et al., "Some Practical Guidance for the Implementation of Propensity Score Matching", IZA: Discussion Paper Series, No. 1588, Germany, May 2005, pp. 32.
"Claritas Forms Life Insurance Consortium with Worldwide Financial Services Association: Initiative with LIMRA International is First of its Kind to Provide Actual Sales Information at Small Geographic Areas," claritas.com, Feb. 9, 2006, 3 pages, http.
"Claritas Introduces PRIZM NE Consumer Electronic Monitor Profiles: New Information Product Provides Insight Into the Public's Purchasing Behaviors of Consumer Electronics," claritas.com, May 30, 2006, 3 pages.
Click Z, "ISPs Collect User Data for Behavioral Ad Targeting," dated Jan. 3, 2008, printed from http://www.clickz.com/showPage.html?page=clickz Apr. 16, 2008.
CNET news.com, "Target me with your ads, please," dated Dec. 5, 2007, printed from http://www.news.com/2102-1024_3-6221241.html?tag+st.util.print Mar. 18, 2008.
Creamer, Matthew; Consulting in marketing; Accenture, Others Playing Role in Firms' Processes, Crain's Chicago Business, Jun. 12, 2006, 2 pages.
Delany, Kevin J., et al. , Firm Mines Offline Data to Target Online as downloaded from http://www.commercialalert.org on Apr. 22, 2008, Commercial Alert, Oct. 17, 2007.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
Egol, Len; "What's New in Database Marketing Software," Direct, Aug. 1994, vol. 6, No. 8, p. 39(4).
"Epsilon Leads Discussion on Paradigm Shift in TV Advertising," epsilon.com, Jun. 24, 2004, 2 pages, http://www.epsilon.com/who-pr_tvad040624.html.
Ettorre, Paul Kahn on Exceptional Marketing, Management Review, vol. 38(11), Nov. 1994, pp. 48-51.
Experian-Scorex Announces New Credit Simulation Tool, PR Newswire, Costa Mesa, CA, Jun. 13, 2005.
Fanelli, Marc, "Building a Holistic Customer View", MultiChannel Merchant, Jun. 26, 2006, pp. 2.
Frontporch, "Ad Networks-Partner with Front Porch!" www.frontporch.com printed Apr. 2008 in 2 pages.
Frontporch, "New Free Revenue for Broadband ISPs!" http://www.frontporch.com/html/bt/FPBroadbandISPs.pdf printed May 28, 2008 in 2 pages.
Gonul, et al., "Optimal Mailing of Catalogs: A New Methodology Using Estimable Structural Dynamic Programming Models", 14 pages, Management Science, vol. 44, No. 9, Sep. 1998.
Halliday, Jean, "Ford Recruits Accenture for Marketing Plan," Automotive News Feb. 13, 2006, 2 pages, Crain Communications.
Haughton et al., "Direct Marketing Modeling with CART and CHAID", Journal of Direct Marketing, Fall 1997, vol. 11, No. 4, pp. 42-52.
Helm, Burt, "Nielsen's New Ratings Yardstick," businessweek.com, Jun. 20, 2006, 3 pages, http://www.businessweek.com/technology/content/jun2006/tc20060620_054223.htm.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.

(56) References Cited

OTHER PUBLICATIONS

Ideon, Credit-Card Registry that Bellyflopped this Year, Is Drawing some Bottom-Fishers, The Wall Street Journal, Aug. 21, 1995, pp. C2.

Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single<_id=117, printed Oct. 4, 2007 in 2 pages.

Instant Access to Credit Reports Now Available Online with DMS' CreditBrowser-based system also Simplifies Credit Decisioning and Offers a Central Point of Control, Business Wire, p. 0264, Dallas, May 23, 2000.

"Intelligent Miner Applications Guide", IBM Corp., Apr. 2, 1999, Chapters 4-7, pp. 33-132.

"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.

"Japan's JAAI system appraises used cars over internet", Asia Pulse, Mar. 3, 2000.

Lamons, Bob, "Be Smart: Offer Inquiry Qualification Services," Marketing News, ABI/Inform Global, Nov. 6, 1995, vol. 29, No. 23, pp. 13.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Loshin, Intelligent Enterprise: Better Insight for Business Decisions, "Value-Added Data: Merge Ahead", Feb. 9, 2000, vol. 3, No. 3, 5 pages.

"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.

Miller, Joe, "NASA used-car prices go online", Automotive News, Jun. 14, 1999, p. 36.

Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.

Muus, et al., "A Decision Theoretic Framework for Profit Maximization in Direct Marketing", Sep. 1996, pp. 20.

NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.

Polatoglu et al., "Theory and Methodology, Probability Distributions of Cost, Revenue and Profit over a Warranty Cycle", European Journal of Operational Research, Jul. 1998, vol. 108, Issue 1, pp. 170-183.

Predictive Behavioral Targeting http://www.predictive-behavioral-targeting.com/index.php.Main_Page as printed Mar. 28, 2008 in 4 pages.

"PremierGuide Announces Release 3.0 of Local Search Platform", Business Wire, Mar. 4, 2004, Palo Alto, CA, p. 5574.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

Reinbach, Andrew; MCIF aids banks in CRA Compliance, Bank Systems & Technology, Aug. 1995, vol. vol. 32, Issue No. 8, pp. pp. 27.

SalesLogix.net, SalesLogix Sales Tour, http://web.archive.org/web/20010411115938/www.saleslogix.com/home/index.php3celli . . . as printed on Aug. 30, 2005, Apr. 2000, 19 Pgs.

Sawyers, Arlene, "NADA to Offer Residual Guide", Automotive News, May 22, 2000, p. 3.

Sax, Michael M., Data Collection and Privacy Protection: An International Perspective, Presentation: Managing Online Risk and Liability Conference, Aug. 31, 1999, pp. 58.

Schmittlein et al., "Customer Base Analysis: An Industrial Purchase Process Application", Marketing Science, vol. 13, No. 1 (Winter 1994), pp. 41-67.

"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

Sweat, Jeff; "Know Your Customers," Information Week, Nov. 30, 1998, pp. 20.

Tao, Lixin, "Shifting Paradigms with the Application Service Provider Model"; Concordia University, IEEE, Oct. 2001, Canada.

Thoemmes, Felix, "Propensity Score Matching in SPSS", Center for Educational Science and Psychology, University of Tübingen, Jan. 2012.

UPI, "Nielsen Media Research goes electronic," Jun. 14, 2006, 1 page.

"VOD Integration Now Available in Strata: Buyers / Sellers Benefit from VOD Component on Popular Platform," stratag.com, Feb. 21, 2006, 1 page, http://www.stratag.com/news/mediapress022106.html.

"WashingtonPost.com and Cars.com launch comprehensive automotive web site for the Washington area", PR Newswire, Oct. 22, 1998.

Whitney, Daisy; Atlas Positioning to Shoulder VOD Ads; Campaign Management Tools Optimize Inventory, TelevisionWeek, May 23, 2005, 3 pages.

U.S. Appl. No. 60/146,074, filed Jul. 28, 1999, Tomkow.

U.S. Appl. No. 60/172,479, filed Dec. 17, 1999, Tomkow.

"Aggregate and Analyze Social Media Content: Gain Faster and Broader Insight to Market Sentiment," SAP Partner, Mantis Technology Group, Apr. 2011, pp. 4.

Akl, Selim G., "Digital Signatures: A Tutorial Survey," Computer, Feb. 1983, pp. 15-24.

Davies, Donald W., "Applying the RSA Digital Signature to Electronic Mail," Computer, Feb. 1983, pp. 55-62.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

McNamara, Paul, "Start-up's pitch: The Envelope, please," Network World, Apr. 28, 1997, vol. 14, No. 17, p. 33.

"PostX to Present at Internet Showcase", PR Newswire, Apr. 28, 1997, pp. 2.

PostX, "PostX® Envelope and ActiveView", http://web.archive.org/web/19970714203719/http://www.postx.com/priducts_fm.html, Jul. 14, 1997 (retrieved Nov. 7, 2013) in 2 pages.

Smith, Richard M., "The Web Bug FAQ", Nov. 11, 1999, Version 1.0, pp. 4.

White, Ron, "How Computers Work", Millennium Edition, Que Corporation, Indianapolis, IN, Sep. 1999.

International Search Report and Written Opinion for Application No. PCT/US2007/021815, dated Sep. 5, 2008.

International Search Report and Written Opinion in PCT/US08/083939, dated Jan. 29, 2009.

International Search Report and Written Opinion for Application No. PCT/US09/60393, dated Dec. 23, 2009.

International Search Report and Written Opinion for Application No. PCT/US09/37565, dated May 12, 2009.

International Search Report and Written Opinion for Application No. PCT/US2010/034434, dated Jun. 23, 2010.

\* cited by examiner

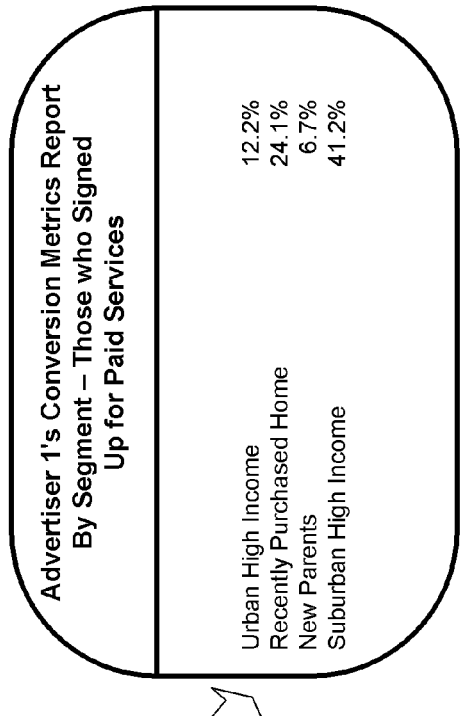

Advertiser 1's Match Report

Total Match with Publisher    2,198,001
Segment - Urban High Income    700,895 (32%)
Segment – Recently Purchased Home    10,521 (0.4%)
Segment – New Parents    26,068 (1.2%)
Segment - Suburban High Income    1,156,560 (52%)

FIGURE 8A

Advertiser 1's Conversion Metrics Report

Total Campaign    2,198,001
Visited Site    200,895 (9%)
Signed Up Free Trial    83,521 (3.7%)
Signed Up Paid Services    26,068 (1.2%)

Advertiser 1's Conversion Metrics Report By Segment – Those who Signed Up for Paid Services

Urban High Income    12.2%
Recently Purchased Home    24.1%
New Parents    6.7%
Suburban High Income    41.2%

FIGURE 8B

SYSTEMS AND METHODS FOR PROVIDING ANONYMIZED USER PROFILE DATA

CROSS-REFERENCE TO RELATED APPLICATIONS

This application claims priority to, and is a continuation of, U.S. application Ser. No. 12/777,998 filed May 11, 2010, soon to be issued as Pat. No. 8,639,920, which claims the benefit of priority from U.S. Provisional Patent Application No. 61/177,205 filed on May 11, 2009, entitled "Systems and Methods for Providing Anonymized Marketing Information," the entire contents of which are hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

1. Field

This disclosure relates in general to computer data processing, and in particular to computer based systems and methods for providing anonymized user profile data.

2. Description of the Related Art

In the online environment, the effective delivery of customized content is dependent on the quality of known data about the intended consumers of such content. For example, the effectiveness of an advertisement ("ad") is enhanced when it is delivered to a person whose attributes and/or other recorded past actions indicate possible interest in the content of the ad. While user profile data may be used to customize the delivered content, the sharing of such data is hindered by reluctance among entities that hold such data out of competitive and privacy concerns. For example, while an advertiser may benefit from improved ad customization as a result of sharing information about its customers with a content publisher from which it wishes to purchase ads, the advertiser is typically reluctant to share such data.

SUMMARY OF THE DISCLOSURE

Embodiments of the disclosure are directed to computer based systems and methods for sharing user profile data in an anonymized manner. Embodiments facilitate confidential and secure sharing of de-personalized and/or anonymous customer profile data among entities to improve the delivery of customized content. For example, embodiments of the invention provide a data appliance to an entity such as a business to convert profile data about the business's customers into anonymous identifiers. A similar data appliance is provided to a content provider in one embodiment to generate identifiers for its user profile data. A central server connected to the data appliances facilitate the sharing of the anonymous identifiers across data networks. In one embodiment, because the anonymous identifiers are generated with the same anonymization method, identical identifiers are likely generated from profile data of the same users. Therefore, the identifiers can be used to anonymously match the customers of the business to the users of the content provider. As such, the matched data can be shared to improve the delivery of customized content such as advertisements that the business wishes to place with the content provider without requiring the business to disclose customer data in an unencrypted form, and any non-matched data can remain confidential.

One embodiment of the invention is system for anonymously sharing user profile data among a plurality of entities. The system comprises a plurality of data appliances located at a plurality of entities with user profile data and a server configured to communicate with each of the plurality of data appliances to facilitate sharing of user profile data among the plurality of data appliances. The plurality of data appliances further includes a first data appliance that is configured to: receive, from a first entity, first user profile data for a first group of users associated with the first entity, the first user profile data including names and addresses of the first group of users; encrypt the first user profile data for each of the first group of users into a first encrypted identifier; and send the first encrypted identifiers to the server. The plurality of data appliances also includes a second data appliance that is configured to: receive, from a second entity, second user profile data for a second group of users associated with the second entity, the second user profile data including names and addresses of the second group of users; encrypt the second user profile data for each of the second group of users into a second encrypted identifier with the same encryption used by the first data appliance, so that common user profile data between the first and second user profile data are converted into identical encrypted identifiers; receive from the server the first encrypted identifiers; and locate identical identifiers from among the first and second encrypted identifiers to generate an anonymous list of common users between the first and second groups of users, whereby the list can be used to customize content provided by the second entity to the users associated with the first entity.

Another embodiment is a system for anonymously sharing user profile data among a plurality of entities. The system comprises a plurality of data appliances and a server configured to receive data from and transmit data to the plurality of data appliances. The plurality of data appliances comprises a first data appliance that is configured to: receive, from a first entity, first personal identifiable information related to a first group of persons; transform the first personally identifiable information into first encrypted data via an encryption process, the first encrypted data comprising an identifier for each of the first group of persons; and send the encrypted data to the server. The plurality of data appliances also comprises a second data appliance that is configured to: receive, from a second entity, second personally identifiable information related to a second group of persons; transform the second personally identifiable information into second encrypted data with the encryption process used by the first data appliance, the second encrypted data comprising an identifier for each of the second group of persons; receive from the server the first encrypted data; and use the first and second encrypted data to anonymously generate list data related to common persons between the first and second groups of persons, so that the list data can be used to customize information provided by the second entity at a direction of the first entity.

Yet another embodiment is a method for sharing anonymized user profile data. The method comprises: receiving at a first data appliance, first personally identifiable information related to a first group of persons; transforming the first personally identifiable information into first encrypted data via an encryption process, the first encrypted data comprising an identifier for each of the first group of persons; transmitting the first encrypted data from the first encrypted data to a second data appliance; receiving, at the second data appliance, second personally identifiable information related to a second group of persons; transforming the second personally identifiable information into second encrypted data with the encryption process, the second encrypted data comprising an identifier for each of the second group of persons; and using the first and second encrypted data to anonymously generate list data related to common persons between the first and second groups of persons, so that the list data can be used to customize information provided by the second entity at a direction of the first entity.

BRIEF DESCRIPTION OF THE DRAWINGS

Specific embodiments of the invention will now be described with reference to the following drawings, which are intended to illustrate embodiments of the invention, but not limit the invention:

FIGS. 8A and 8B show examples of audience reports output by the system in accordance with one embodiment.

DETAILED DESCRIPTION OF THE PREFERRED EMBODIMENTS

Figure 1:
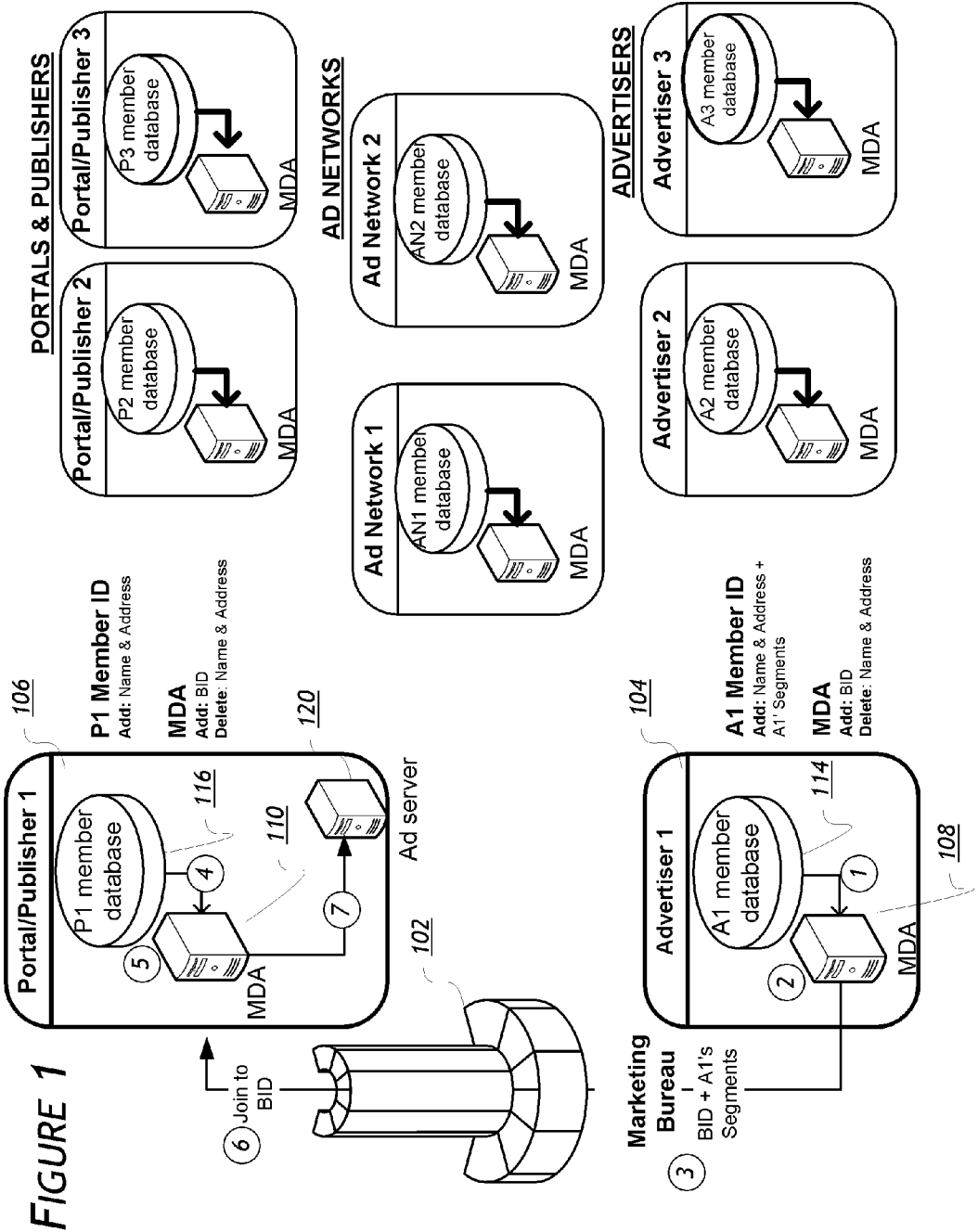
FIG. 1 is a flow diagram illustrating one embodiment of the marketing data sharing architecture.

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.
System Overview The effectiveness of online advertising has been shown to improve significantly when an advertisement ("ad") is customized for a consumer based on known data about that consumer. Ad customization can be performed by either the sellers or buyers of online advertising. Sellers of online advertising include (but may not be limited to) web publishers, portals and ad networks. Buyers of online advertising are advertisers and their agencies. The amount of information that parties have about the consumers they interact with differs based on the type of business they are. An advertiser may have an established database of its customers, both online and offline, that collects information about the consumer's interaction with that advertiser's business. Additionally, an online publisher that requires its users to login to its website as members may have detailed information on each user member. By contrast, an ad network may not have a simple way of collecting customer data other than via observed behaviors.

Regardless of the relative volume of known consumer profile data, for reasons of existing privacy policies and/or for competitive and strategic considerations, companies are traditionally reluctant to share consumer data without the existence of some trusted third party that can protect the confidential information of each contributor. For example, an advertiser A may share a number of common customers with a publisher B. Advertiser A may wish to only target its ads to those common customers on publisher B's website. One way of to achieve this is for A to send B a complete list of its customers and have B match the list against its own member list. However, Advertiser A may be reluctant to share such data with Publisher B for privacy, competitive and strategic reasons. However, if C, a trusted third party, took responsibility for merging the consumer data from Advertiser A and from Publisher B, identifying the overlap, and providing the customization data back to Publisher B in a manner through which consumer identifying information is anonymized, then the parties may be more inclined to use their known data for ad customization. In this manner, A will ensure that B will only know the common users/customers without seeing all of A's customers. If this capability could be made available across a large number of ad sellers, then an advertiser could make highly targeted ad buys across multiple ad sellers.

Embodiments of the invention facilitate confidential and secure sharing of de-personalized and/or anonymous customer profile data between companies for the purposes of improving ad targeting. Companies that would share such data could include buyers of media (e.g., advertiser), sellers of media (e.g., publisher, portal, or ad network), multiple advertisers (in a co-operative type model), or multiple sellers of media. Embodiments of the invention enable an entity to de-personalize and/or anonymize its own consumer data and match that data to a third party's consumer data via anonymous keys. As such, the user profile data can be shared to improve ad customization without the need to disclose sensitive data in an unencrypted form.

Embodiments of the invention comprise a network of marketing data appliances (MDAs) that connect to each other to provide data matches among various entities. The MDAs perform data standardization and encryption to de-personalize the data. An MDA can also use an anonymous key, common to all MDAs to match similar data among MDAs. An entity that wishes to participate in the sharing of data can install the MDA within its secured network environment or can use a central installation. Alternatively, an entity may also share data using MDAs that are hosted off-site via secured transmission channels. The MDAs may be interconnected to one another, as well as to one or more marketing bureaus that serve as hubs that support the anonymization and matching processes performed at the local MDAs. In one or more embodiments, marketing bureaus are data processing entities with computing capacity (computer servers) that can handle matching and anonymization functions. Additional details relating to marketing bureaus will be provided later in the specification.

Embodiments of the data sharing system are beneficial in several ways. First, they enable media buyers to target against their own criteria instead of or complementary to the media's available criteria, thereby reducing media waste and increasing the precision and response of their advertising. Second, they enable media buyers to focus their media purchases without the need to disclose confidential user profile data about their customers. Third, the various embodiments create a virtual network that links disparate entities with potentially different data formats and provides a standardized way to exchange ad targeting and/or other relevant data. Finally, the various embodiments create a dynamic data accounting method that enables both media buyers and sellers to instantly view the number of targeted users at various publisher or portal sites through the use of an audience selector tool.

Although this disclosure provides example embodiments for Internet or online advertising, embodiments of the invention are not so limited to those environments. For example, embodiments of the invention can be implemented in any environment with addressable devices. For example, embodiments may be used to target advertisements served to wireless devices such as cell phones and PDAs, cable television and satellite TV set top boxes, gaming consoles, and other portable devices such as music players and electronic book readers. Embodiments of the invention may be used in numerous environments, even those without "addressable" systems or those in "non-digital" media. Embodiments can be used in non-digital environments such that anonymized marketing data can be used to conduct, for example, phone or postal mail advertising campaigns. This is because, in addition to real-time request/response handling for ad and/or content customization, some embodiments provide productionized and efficient merge, purge, and data enhancement capabilities that can function in "batch" mode of operations, which can be performed daily/nightly/weekly or incrementally (every n hours).

System Architecture and Process

FIG. 1 depicts the components of the data sharing architecture. Although a marketing bureau 102 is shown as connecting an advertiser 104 to a portal or publisher 106, in FIG. 1, the marketing bureau 102 can connect other entities shown in the figure as well. The advertiser 104 and the portal or publisher 106 are highlighted in FIG. 1 as examples. As shown, the advertiser 104 has a member database 114 and the portal or publisher 106 has its own member database 116 as well.

Anonymization of User Profile Data Provided by Advertisers

In one embodiment, to enable anonymized data sharing through the marketing bureau 102, the advertiser 104 installs a MDA 108 within its own environment, which may be protected by a network firewall. The bureau 102 may host a computer server that acts as a central repository for all information about each participating entity's address market. The information may include market segment data, for example. As described below, the data sharing architecture includes a network of interconnected MDAs that enable all connected entities to share data. The anonymized sharing and data matching process proceeds as follows. In step 1, the advertiser 104 may upload, from its member database 114, any (1) personally identifiable information (PII) data such as member names, postal addresses, and (2) additional data such as segments onto the MDA 108. The uploaded data will be referred to as marketing data in this disclosure, and marketing data may include other non-PII data such as IP addresses, email addresses, cookie IDs, etc. In other embodiments, the PII may include email addresses, user IDs, social security numbers, IP addresses, phone numbers, etc. As used herein, "profile data," "customer data," and "consumer data" are used to refer generally to both PII and marketing data.

In step 2, as these records are being uploaded, the MDA 108 may derive bureau IDs (BIDs) by encrypting, through for example a forward encrypting hash algorithm such as SHA, some or all of the member's PII, e.g., name and postal address information. In another embodiment, a proprietary hash algorithm is used. For example, a name "John Doe" and an address "123 Main St." may be hashed into a resultant BID string "A348BEF6" so that the name and address cannot be deciphered from reading the resultant string. Once the BIDs are derived, the encryption process then purges the uploaded names, postal addresses, and other PII data. Because in various embodiments the encryption hashing algorithm is not data dependent, matching may be performed on other member/customer profile data such as membership IDs, vehicle IDs, cookie IDs, phone numbers, and/or email addresses. Any of the identifiable information that is used as input for the match, like a cookie ID or an email address, is subsequently converted into a BID. In one embodiment, if only name and ZIP code are provided, the MDA 108 first attempts to locate the complete postal address using the name and ZIP code and then performs the hashing process.

In one embodiment, the encryption process of step 2 takes place while the uploaded marketing data records are still in volatile memory such as in the MDA's random access memory (RAM). As such, sensitive records containing PII such as names and addresses are not placed in long term storage of the MDA. In one embodiment, the MDA does not need to use the full set of marketing segment data from the marketing bureau server in the encryption process.

After the encryption processing has completed, the MDA 108 stores records that include BIDs and the advertiser appended custom segment data and/or generic segment data appended by the MDA. For example, if the advertiser 104 were a credit reporting agency, it might append custom segment data that indicates whether a consumer is a free trial, paid, or cancelled member of its credit reporting subscription service. Also, the MDA 108 may append generic marketing data (segments) from other sources. The appended marketing segment data may be selected by the advertiser. For example, while an advertiser may not have its own custom segment data, it may instruct the MDA to append segment data identifying "New Parents" or "New Homeowners." The MDA 108 may use a localized copy of marketing segment data that is periodically updated by a remote server. The localized copy may be encrypted.

If any of the advertiser's appended data is deemed sensitive, the MDA 108 may apply additional security hashing to the appended data to provide a further tier of protection. The MDA may be configured so that no personally identifiable information (PII) is passed outside of the advertiser's environment.

In step 3, in one embodiment, the now anonymized advertiser's segment data is then propagated, through the marketing bureau 102, to some or all of participating entities that are connected to the data sharing network, including the publisher, portal, or ad network from which the example advertiser may wish to buy media. In one embodiment, steps 1-3 as described above may be performed as part of a nightly batch processing job. However, one or more the steps may be performed in real time or as part of a batch job executed at different intervals (e.g. weekly). Once the initial matching and propagation steps are accomplished upon an entity joining the data sharing network, subsequent matching and propagation may be performed on a smaller subset profile data within the member database that includes recent changes.

Embodiments of the invention also allow advertisers to identify some or all of its uploaded marketing data as the ideal or targeted modeling criteria for expanded or "look-alike" matching. For example, an advertiser may specify that ZIP codes be used as an expanded matching criterion, so that the matching process performed by the MDA located at the publisher, portal and/or ad network as further described below returns matching results with additional persons who may live in or near the ZIP code areas of those consumers identified within the advertiser's data. Similarly, an advertiser may select one or more segments on which an expanded matching may be performed (e.g. matching on a "New Parents" or New "Homeowners" segment). In one embodiment, the look-alike matching uses demographic and consumer attributes (e.g. age, gender, income, purchase preferences, etc.) to identify additional persons who are similar to those in the matched results.

In one embodiment or more embodiments, an advertiser can identify ideal or targeted criteria through one of two methods. First, an advertiser can identify ideal or targeted criteria by inserting data flags into the uploaded marketing data records as part of the upload process described above. The uploaded data records may be termed a "primary list" in one or more embodiments. Second, an advertiser can provide a secondary list in conjunction with the primary list, with the secondary list providing a list of records on the primary list that have the ideal or targeted criteria.

Anonymization of User Profile Data Provided by Publishers and Portals

In one embodiment, similar to the advertisers, publishers and portals also install MDAs locally and possibly within their firewalls. In one embodiment, similar to steps 1-3, the portal or publisher 106 undertakes step 4 to upload its subscriber or member file onto an MDA 110 and in step 5 a similar encryption process takes place within MDA 110. The subscriber or member file may include marketing data, which may include PII data and other additional data such as segment data. In one embodiment, a forward encrypting hash algorithm (e.g., SHA) is applied to some or all of the subscriber's or member's PII, e.g., name and postal address information, to derive BIDs. Using the example from above, a "Joe Doe" at "123 Main St." may be hashed into a resultant BID string "A348BEF6," which, as described below, is used to match the BID previously generated at the advertiser's MDA. In other embodiments, the PII may include email addresses, user IDs, social security numbers, IP addresses, phone numbers, etc. In one embodiment, if only name and ZIP code are provided, the MDA 110 first attempts to locate the complete postal address using the name and ZIP code and then performs the hashing process. In one embodiment, the derived BIDs replace the names and postal addresses in RAM, ensuring that no names, postal addresses or other PII are stored in non-volatile memory storage. The MDA 110 may include a localized copy of marketing segment data that is periodically updated by a remote server. The localized copy may be encrypted.

Joining/Matching User Profile Data

In step 6, the BID is then used as the connecting key between the disparate data sets from the advertiser 104's member and segment data and those of the portal or publisher 106. In particular, the MDA 110 of the portal or publisher 106 uses the BIDs to join or match the incoming data (from the advertiser 104) with those from the member database 116 of the portal or publisher 106. Although not shown in FIG. 1, the same BID match process can be used to match data between an advertiser and an ad network as well. In one embodiment, once the matching ends, the BIDs are purged, leaving the publisher, portal or ad network's own identifier for a particular consumer and the advertiser's client segment for that same consumer. Thus, the matching is done such a way any nonmatched data of the advertiser remains confidential and not revealed to the publisher or portal.

After the processing has completed, the MDA 116 contains records that include BIDs and user IDs from the publisher or portal 106 and ad segment. This creates a set of valid BID to user ID mappings for the network. In one embodiment, the BIDs are then purged, leaving only the publisher, portal or ad network's own identifier for a particular consumer (e.g., user ID) and the advertiser's segment for that same consumer. In step 7, the portal or publisher 106 may then export the list of joined user IDs and the corresponding advertiser's segment data to its proprietary ad server 120 or to an outsourced ad sever. Alternatively, as shown later in FIG. 3, the joined user IDs and the corresponding advertiser's segment data may be retrieved in real time through the use of a compute cluster.

With the data matching completed, advertisers can then include or exclude their own member households or otherwise target their own data in their media buys with publishers or portals. The process may proceed as follows. The advertiser 104 may place a media buy insertion order with the portal or publisher 106. The portal or publisher 106 may possibly stipulate to not target existing members of the advertiser 104. The portal or publisher 106 may then export a list from its local MDA 110, comprised of only its own members that are also known members of the advertiser 104, and upload the list onto its ad server as an "exclusion target" for a campaign, where segment(s) of customers/members are excluded from a media campaign (e.g. existing customers/members are excluded).

The MDAs make up a distributed network that facilitates businesses' ability to connect with each other's data in real time or batch mode and in a secure manner that de-personalizes consumer information throughout the processing steps. While FIG. 1 depicts a data flow from an advertiser to a portal/publisher, embodiments of the invention can facilitate data sharing between any entity depicted, e.g., between two advertisers, between two ad networks, or between two publishers/portals.

In one embodiment, MDA ensures that any set of data elements does not constitute a signature. This means that, for example, any set of data elements must be the same for at least 100 users or 0.05% of the users, whichever is greater. In one embodiment, if a data element set has less than 100 users, that element is not created so as to protect the privacy of the few users that may constitute that element.

In one embodiment, the matching process takes into account the generic or custom segment data and/or expanded matching criteria. Thus for example, before or after identifying the overlap in users/members/subscribers between the advertiser and the publisher/portal, the matching process may apply criteria to narrow or expand the match results. The matching process may narrow by filtering the results through segment matching. For example, the results may be narrowed down to include those records with matching segments only. As discussed above, the segments may be custom (created by the advertisers) or generic (selected by the advertisers from a list of available segments). The matching process may also expand the overlap results by using expanded or "look-alike" matching as previously described. In these embodiments, the matching process adds to the overlap list users/members/subscribers of the publisher or portal that do not already appear on the overlap list but nonetheless match one or more ideal or targeted criteria as specified by the advertiser. In one or more embodiments, the system is highly customizable and the advertiser can select a combination of narrowing or expanding matching processes as described above.

Ad Network

Although ad networks sell media to advertisers across publisher websites with their networks and have large ad distribution capability, they generally have very limited or no PII such as names or postal addresses for their "members," which in this case include households or users that are tracked by the ad networks. Instead, for each end user, ad networks generally create a unique user ID that they store locally and in cookies on the end user's computer. Cookies are small text files that are deposited onto consumers' computers and generally contain basic identifying information such as user IDs, time stamps, etc.

One embodiment directed at the ad network model takes into account information that the ad networks may pass back to advertisers. In addition to the process described above in conjunction with FIG. 1, this embodiment allows for the ad network to pass its user ID to back to the advertiser when an end user clicks on the advertiser's ad.

Figure 2:
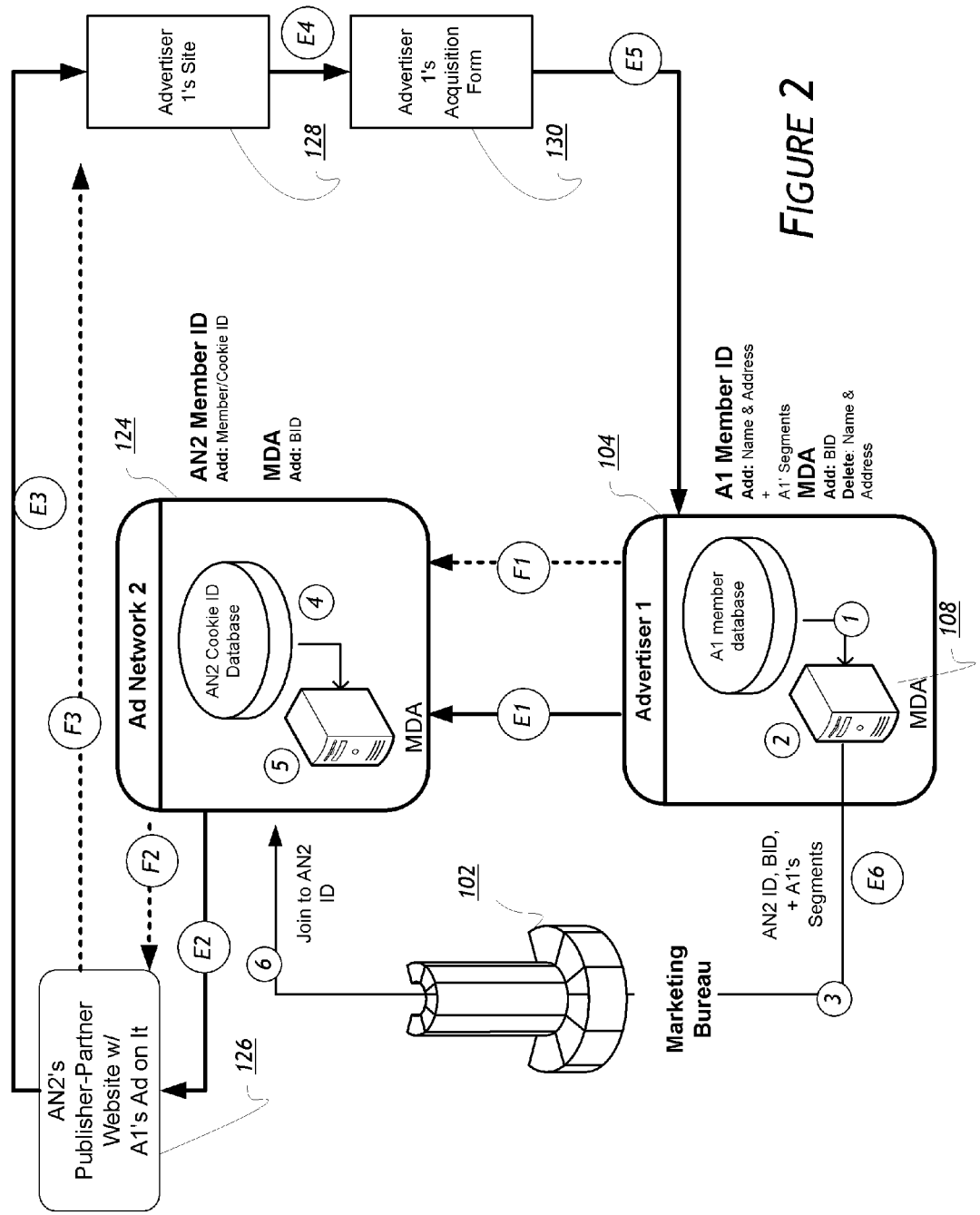
FIG. 2 is a flow diagram illustrating the process of loading and matching data with the user ID pass-through feature according to one embodiment.

FIG. 2 illustrates this additional user ID pass-through feature. User ID matching steps 1-6 are substantially similar to the corresponding steps illustrated in FIG. 1. After they are completed, the advertiser 104 may arrange for the ad network 124 to pass its user ID to the advertiser 104 in the "E" series of steps shown in FIG. 2. The user ID may be passed via a cookie or other suitable means. In step E1, the advertiser 104 places an insertion order for a media buy with the ad network 124. In step E2, the ad network exports a list of user IDs with the advertiser's segments to a publisher-partner site 124. In step E3, when a visitor clicks on an ad served by on the publisher-partner site 124, the visitor is re-directed to the advertiser's site 126. During the re-direction, the advertiser 104 receives the ad network's user ID for that visitor. In step E4, the user ID is carried through to the visitor's session with the advertiser, which may end with a registration or lead form 130 for service sign up. Assuming the visitor completes the registration or lead form 130, the advertiser 104 receives his or her marketing data including PII, e.g., name and postal address, and in step E5 passes the newly received marketing data to its local MDA 108.

In one embodiment, in the MDA 108 the above described anonymization process would be executed the newly received marketing data. In one embodiment, after the anonymization processing is executed in the MDA's RAM, the MDA may contain a BID, the advertiser's segments, and the ad network's user ID. In step E6, this newly processed information is passed through the marketing bureau to the ad network 124, so that it can be joined, in the ad network's local MDA, with a forward hashed version of the ad network's user ID. After the new data match in step E6, the ad network would have the ability to connect its user IDs with the advertiser's segments.

The "F" series of steps illustrate an alternate embodiment in which the advertiser is using the data sharing system to target specific segments on the publisher-partner site 126 using data obtained in the "E" series of steps. In step F1, the advertiser 104 may place a media buy with the ad network 124, targeting its members with, for example, upsell offers. In step F2, the ad network 124 may export a list of its IDs and the advertiser's members that are the targets for upselling, and upload the list to the ad server for the publisher-partner site 126. When users who are members of the advertiser 104 visit the publisher-partner site 126, they may see ads that are targeted to them for upselling, leading them to the advertiser's site 128.

Data Transmission

In one embodiment, data that are transmitted from the advertiser to the publisher or portal are fully encrypted. These data may be passed using an encryption scheme such as GPG (GnuPG) and the keys to decrypt the data exist on the target MDAs. For example, in FIG. 1, the decryption keys reside on MDA 110. Servers that receive the data in transit do not have the keys required to decrypt the data and act as a pass-throughs to minimize the amount of firewall rules required to accommodate MDAs that receive the data.

Hybrid Real Time Targeting Model

Figure 3:
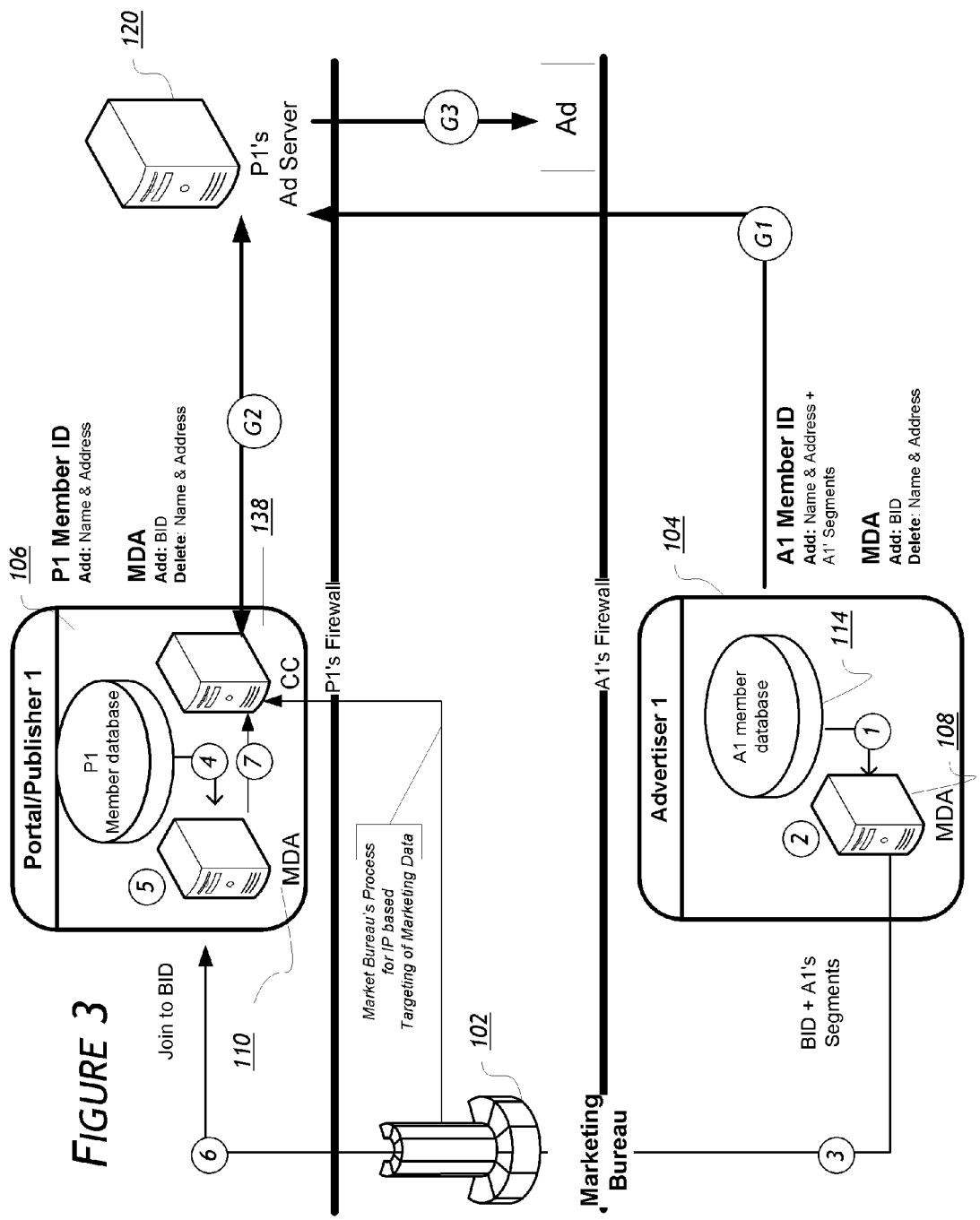
FIG. 3 is a flow diagram illustrating one embodiment of a hybrid real time targeting model.

In one embodiment, a publisher, portal, or an ad network may have a compute cluster 138 installed within its environment in addition to a MDA. An example embodiment with a compute cluster 138 is illustrated in FIG. 3. BID matching steps 1-6 shown in FIG. 3 are substantially the same as the corresponding numbered steps depicted in FIG. 1. However, instead of a simple export to the ad server in step 7, a different process is performed on a per-transaction basis as illustrated in the following "G" series of steps depicted in FIG. 3.

In step G1, the advertiser 104 may place a media buy with the portal or publisher 106. In step G2, when a user visits the portal or publisher site 106, the portal or publisher 106 may send a request to the compute cluster 138 with the user ID that the publisher 106 has assigned to the user, along with the user's IP address. If the compute cluster 138 fails to find a match on the user ID, it may send the IP address to the marketing bureau and retrieve household level targeting or inferred geo-demographic targeting of consumer data. The process of obtaining inferred geo-demographic targeting is further described in co-pending U.S. patent application entitled "SYSTEMS AND METHODS FOR REAL TIME SEGMENTATION OF CONSUMERS," Ser. No. 12/118, 585, filed May 9, 2008, the disclosures of which are hereby fully incorporated by reference. Once the appropriate targeting data is returned to the ad server 120, an ad may be selected based on the targeting data and served in step G3.

With the compute cluster, any publisher, portal, or ad network can offer three tiers of insights to its advertisers, namely by custom segment (FIG. 1), by household level targeting data (e.g., through segment data made available by the compute cluster), and by inferred geo-demographic targeting data (e.g., through functions provided by the compute cluster) (FIG. 3). Having a compute cluster also allows the publisher, portal, or ad network to retrieve advertiser targeting on a transaction-by-transaction basis, rather than exporting a file from its MDA to its ad server.

Localized Copy of Marketing Segment Database

As mentioned above, in some embodiments, each MDA can include a local encrypted copy of a marketing segment database. Thus, in addition to submitting marketing data including PII such as names and addresses from their membership databases, advertisers could then also retrieve the cleansed records (e.g., hygiene—cleanse invalid records, standardization—standardize data elements such as address suffix, and verification—verify the data elements with an external source) along with data enhancement and even custom scores in real time, within their own local environments. For example, the MDA may contain a local copy of segment market data that may be returned as part of the data anonymization process. Similarly, the MDA may perform a process of standardizing the input addresses and may return addresses that conform to U.S. Postal standards, for example. In some embodiments, custom scores may also be returned as part of the process. The functions and features of an individual compute cluster are customizable and may be dynamically updated through data sent from the marketing bureau 102.

Data Partners

Figure 4:
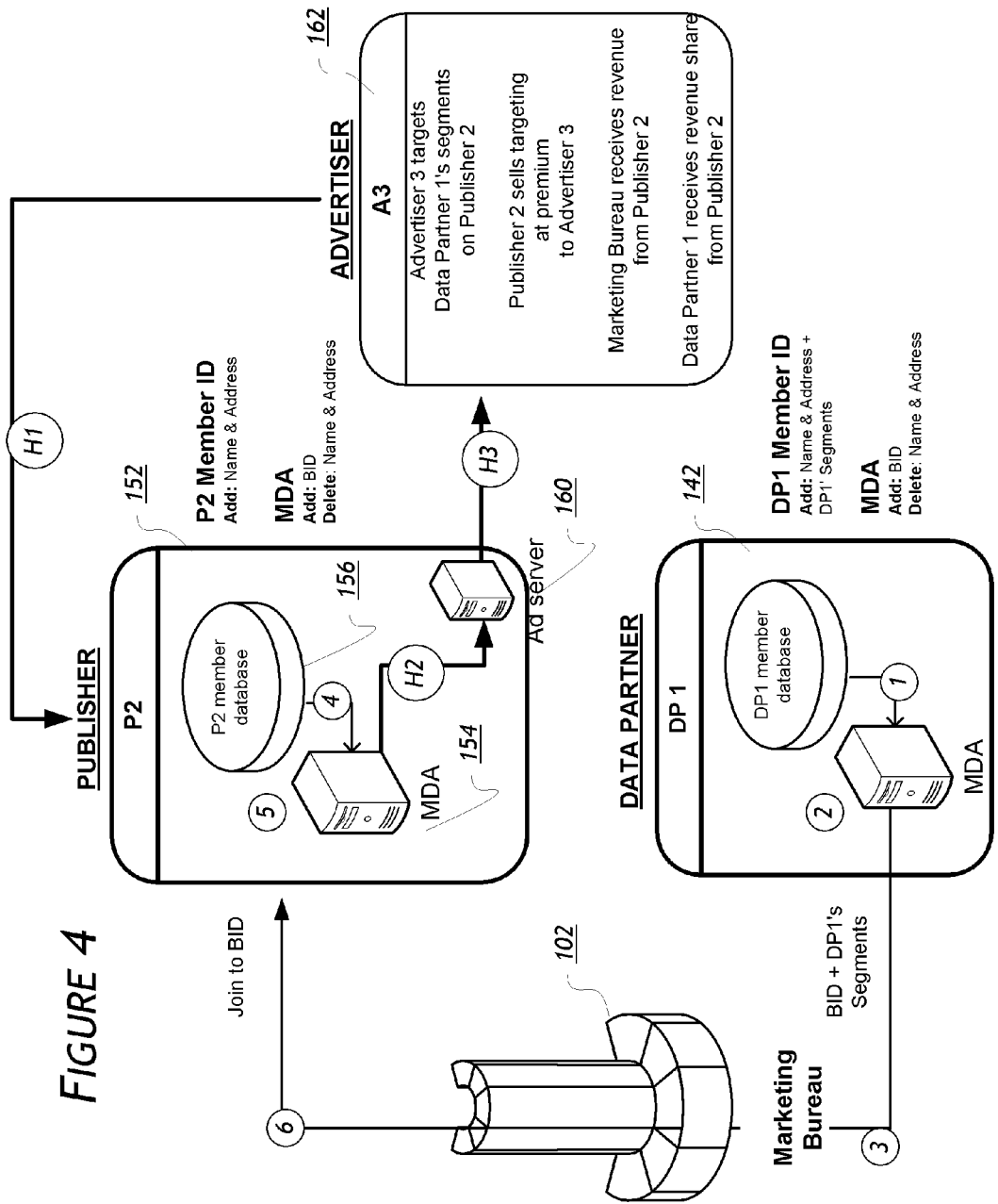
FIG. 4 is a flow diagram illustrating one embodiment for data sharing with a data partner.

FIG. 4 illustrates another embodiment where a data partner 142 is involved in the process. In this embodiment, an advertiser 162 places ads on a publisher 152 while using the data partner 142's segment data to target the ads. The BID matching steps 1-6 shown in FIG. 4 are substantially the same as the corresponding numbered steps depicted in FIG. 1, except in FIG. 4 the matching is conducted between members of the data partner 142 and the publisher 152.

Once the matching steps are accomplished, the process proceeds as illustrated in the "H" series of steps in one embodiment. In step H1, the advertiser 162 places a media buy insertion order with the publisher 152, instructing it to target the data partner 142's members. In step H2, the publisher 152 exports a list from its local MDA 154, comprised of only user IDs from the publisher's member database 156 that are known members of data partner 142, and uploads the list onto its ad server 160 as the target for a campaign for the advertiser 162 on its site. In step H3, acquisition marketing traffic from the display of those targeted ads is driven to the advertiser 162.

Figure 5:
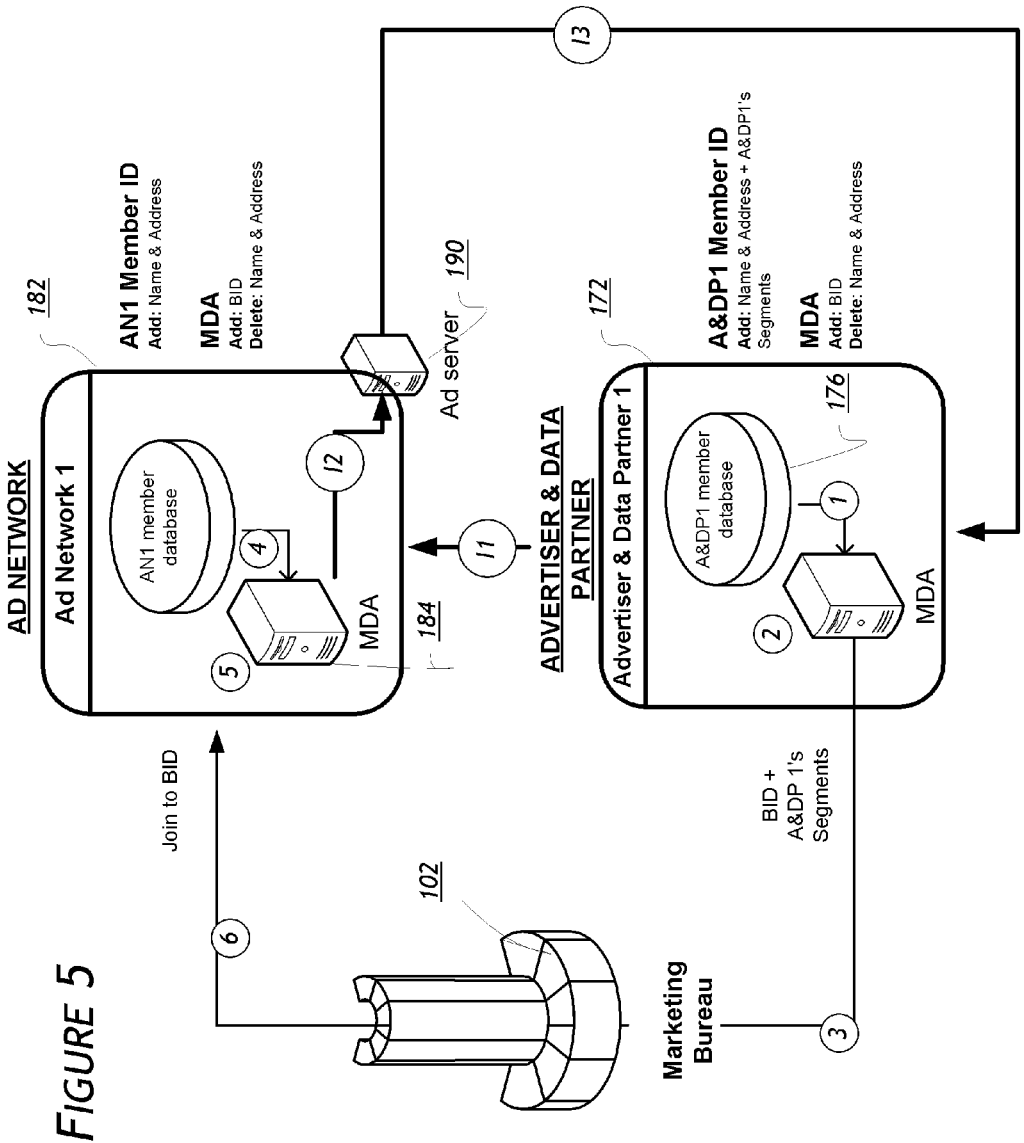
FIG. 5 is a flow diagram illustrating another embodiment for data sharing with a data partner.

FIG. 5 illustrates another example embodiment that connects an advertiser and a data partner 172 to an ad network 182. In this embodiment, an advertiser and data partner 172 places ads on an ad network 182. The BID matching steps 1-6 shown in FIG. 5 are substantially the same as the corresponding numbered steps depicted in FIG. 1. Note that the ad network 182 is able to accomplish the matching steps for the advertiser and data partner 172 because it has access to member data. Some ad networks may not have PII data such as name and address data on which they can conduct the initial BID matching.

Once the matching steps are accomplished, the process proceeds as illustrated in the "I" series of steps in one embodiment. In step I1, the advertiser 172 places a media buy insertion order with the ad network 182, instructing it to target a specific segment of the advertiser and data partner 172's members. In step I3, the ad network 182 exports a list from its local MDA 184, comprised of user IDs from the advertiser and data partner's member database 176, and uploads the list onto its ad server 190. In step I3, acquisition marketing traffic from the display of those targeted ads are driven to the advertiser and data partner 172.

Customized Emails

Figure 6:
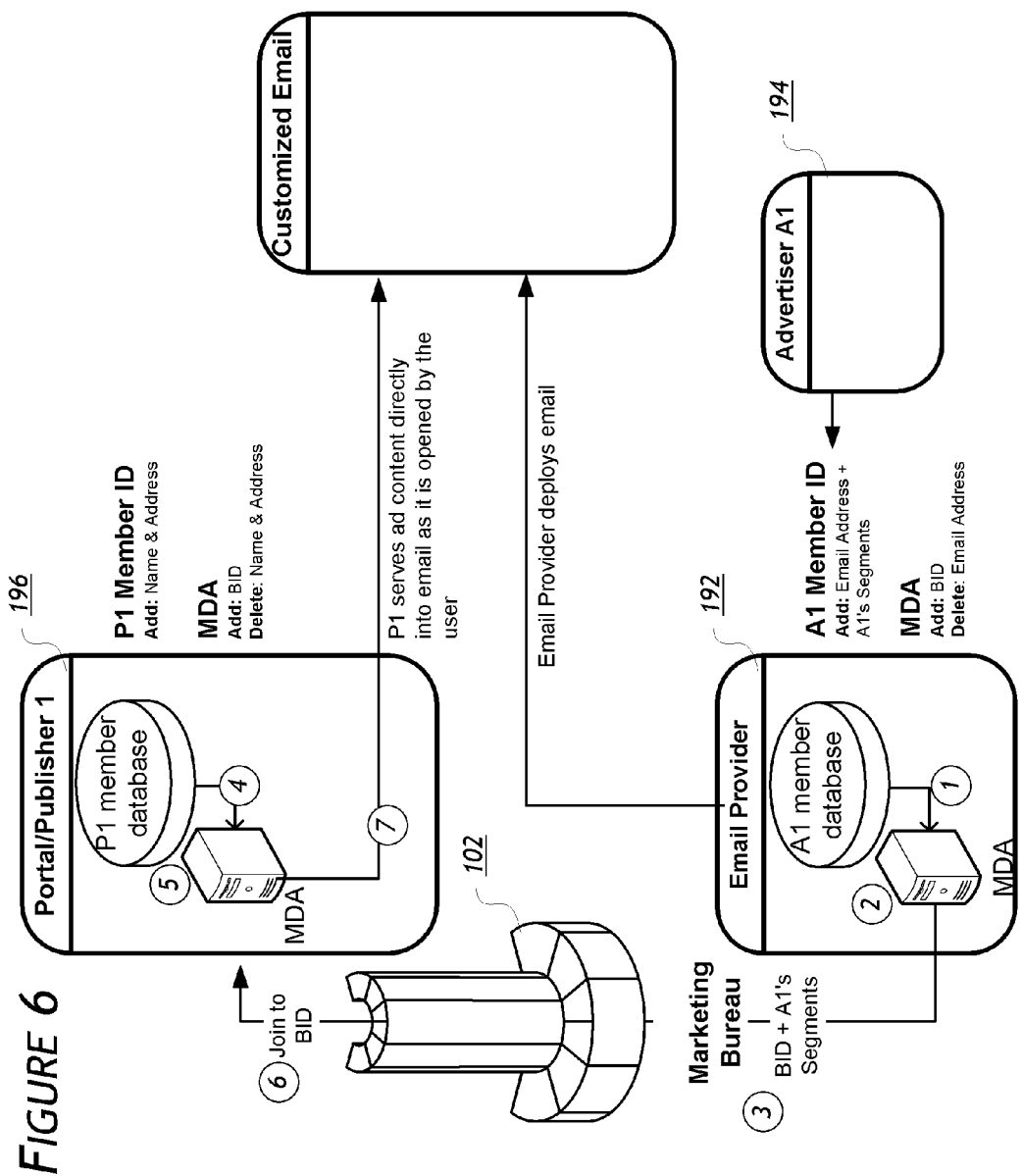
FIG. 6 shows an example audience select tool in accordance with one embodiment.
Figure 7:
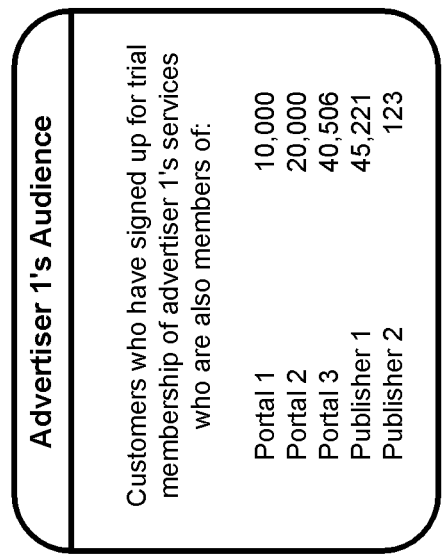
FIG. 7 is a flow diagram illustrating the use of data sharing to generate customized email marketing in accordance with one embodiment.

FIG. 6 illustrates another embodiment in which the data sharing system is applied to provide targeted advertising through customized emails. In this embodiment, a customized email provider 192 purchases ads from an portal/publisher 196 that will be placed into the email provider 192's own emails instead of web pages. The segments used in this matching process are provided by an advertiser A1 194 that wishes to use the email provider 192 to send custom emails on A1's behalf. The BID matching steps 1-6 shown in FIG. 7 are substantially the same as the corresponding numbered steps depicted in FIG. 1. In step 7, matched data from the portal/publisher 196 are exported to a server that sends customized ads to emails generated by the email provider 192.

Audience Selector Tool

With a network of MDAs installed in various advertisers, ad networks, publishers and online portals and interconnected through the marketing bureau, sharing of user profile data may be greatly enhanced and online media buys may be made more efficient. In addition, advertisers may be able to query, through an audience selector tool, the data sharing system to determine how many unique users exist within the desired target entities. For example, an ad buyer may be able to see how many unique users exist on various portal and/or publisher sites that are also free trial members of its services. An example audience selector tool is shown in FIG. 7.

Feedback Data—Match Data and Conversion Metrics

In addition to the audience selector tool, which can assist in pre-purchase planning and allocating decisions, embodiments also provide feedback data to assist advertisers and other participants to monitoring match rates and return on investment. In one or more embodiments, an advertiser can receive feedback on the marketing data uploaded. The feedback data provided by embodiments of the MDA include the number of persons within the uploaded data who match certain segments. FIG. 8A provides an example of the type of match data provided. As shown, an example advertiser is receiving a report on the number of matches with a publisher and the detailed breakdown of matches by segments.

In one or more embodiments, the feedback data provided is based on conversion metrics. To receive conversion metrics data, an advertiser can identify a number of persons who have recently engaged in conversion activities. For example, an advertiser can identify persons who have recently signed up for paid services or filled out a form to request additional information as a result of its advertising efforts initiated through the system. An advertiser may identify such persons through, for example, the two mechanisms described in conjunction with FIG. 1: (1) upload a secondary list of such persons or (2) identify such persons in the primary list by, for example, inserting flags into the data records. The MDA in one or more embodiments processes the uploaded information by cross-referencing it against the primary list(s) uploaded from previous time period(s) and returning an estimated percentage of conversion to the advertiser.

For example, a MDA may receive from an advertiser a list of persons who have engaged in conversion activities in the last week. The DNA may cross reference the new conversion list against the primary list from last week's campaign and return one or more example conversion metrics as shown in FIG. 8B. As shown in the figure, the metrics calculated include a tally of those who visited the site, those who signed up for trial services and those who signed up for paid services. As shown, the metrics results may also include break-down by segments for individual conversion activities. The metrics on conversion activities are customizable and can be used to track any type of activities. For example, when used in contexts outside of internet advertising, a cable television operator may track movie downloads and a wireless service provider may track ringtone or song downloads. Metrics calculations can also be performed at various frequencies, for example, on a real-time or near real-time, daily, weekly, monthly, or yearly basis. The MDA in one embodiment aggregates the metrics over a period of time and provides advertisers a reporting tool for analyzing their return on investment in their advertising efforts.

As mentioned above, the various types of match and feedback data reports provided can be customized by advertisers and/or other interested parties. Similarly, portals, publishers and ad networks may be able to customize such reports and utilize them to provide potential advertisers characteristics of its membership. In addition, advertisers, portals, publishers and ad networks may use the match and feedback data to fine tune matching criteria in expanded ("look-alike") matching operations as described above.

System Architecture

Figure 9:
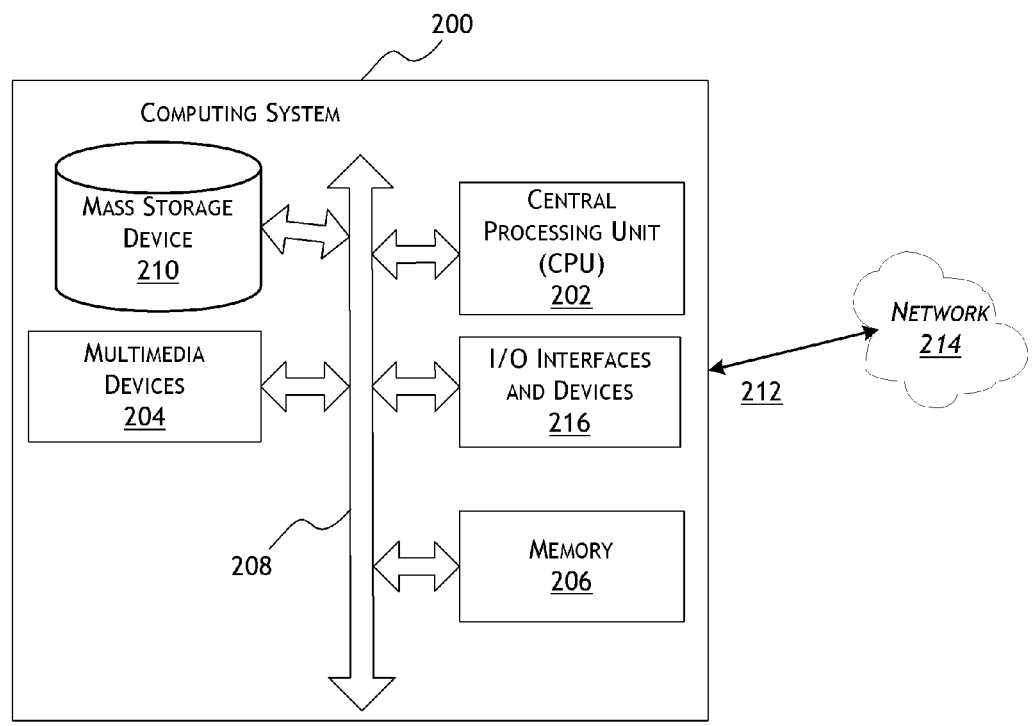
FIG. 9 is block diagram of an example computing system of an embodiment.

FIG. 9 is a block diagram illustrating a computer system 200 for implementing the marketing data appliances, bureau servers, ad servers, compute clusters, and other computer systems and devices illustrated in FIGS. 1 to 6 in accordance with one embodiment. The computer system 200 includes, for example, a personal computer that is IBM, Macintosh, or Linux/Unix compatible. In one embodiment, the computing system 200 comprises a server, a desktop computer, a laptop computer, a personal digital assistant, a kiosk, or a mobile device, for example. In one embodiment, the computing system 200 includes a central processing unit ("CPU") 202, which may include one or more conventional microprocessors. The computing system 200 further includes a memory 206, such as random access memory ("RAM") for temporary storage of information and a read only memory ("ROM") for permanent storage of information, and a mass storage device 210, such as a hard drive, diskette, or optical media storage device. Typically, the components and modules of the computing system 200 are connected to the computer using a standard based bus system 208. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the computing system may be combined into fewer components and modules or further separated into additional components and modules.

The computing system 200 is generally controlled and coordinated by operating system software, such as Windows Server, Linux Server, Windows XP, Windows Vista, Unix, Linux, SunOS, Solaris, or other compatible server or desktop operating systems. In Macintosh systems, the operating system may be any available operating system, such as MAC OS X. In other embodiments, the computing system 200 may be controlled by a proprietary operating system. Conventional operating systems control and schedule computer processes for execution, perform memory management, provide file system, networking, I/O services, and provide a user interface, such as a graphical user interface ("GUI"), among other things.

The computing system 200 includes one or more commonly available input/output (I/O) devices and interfaces 216, such as a keyboard, mouse, touchpad, and printer. In one embodiment, the I/O devices and interfaces 216 include one or more display device, such as a monitor, that allows the visual presentation of data to a user. More particularly, a display device provides for the presentation of GUIs, application software data, and multimedia presentations, for example. The computing system 200 may also include one or more multimedia devices 204, such as speakers, video cards, graphics accelerators, and microphones, for example. In other embodiments, such as when the computing system 200 comprises a network server, for example, the computing system may not include any of the above-noted man-machine I/O devices.

In the embodiment of FIG. 9, the I/O devices and interfaces 216 provide a communication interface to various external devices. In the embodiment of FIG. 9, the computing system 200 is electronically coupled to the network 214, which may comprise one or more of a LAN, WAN, or the Internet, for example, via a wired, wireless, or combination of wired and wireless, communication link 212. The network 214 facilitates communications among various computing devices and/or other electronic devices via wired or wireless communication links.

According to FIGS. 1 to 6, requests are sent to the computing system 200 over the network 214. Similarly, results are returned over the network 214. In addition to the devices that are illustrated in FIG. 9, the computing system 200 may communicate with other data sources or other computing devices. In addition, the data sources may include one or more internal and/or external data sources. In some embodiments, one or more of the databases, data repositories, or data sources may be implemented using a relational database, such as Sybase, Oracle, CodeBase and Microsoft® SQL Server as well as other types of databases such as, for example, a flat file database, an entity-relationship database, and object-oriented database, and/or a record-based database. For example, the above described data including at least the user profile data, the member data, the customer data, the personally identifiable information, and the encrypted data may be stored in various embodiments in these data sources.

In the embodiment of FIG. 9, the computing system 200 also includes program codes and/or instructions stored on the mass storage device 210 that may be executed by the CPU 202. The program codes and/or instructions may include modules for performing user profile data anonymization, hashing, data encryption, data matching, and audience reporting as described above. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Alternately, the modules may be implemented as separate devices, such as computer servers.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

CONCLUSION

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for anonymously sharing user profile data among a plurality of entities, comprising:
one or more hardware computing devices configured to at least:
access first user profile data for each of a plurality of first users associated with a first entity;
encrypt, using a particular encryption technique, at least some of the first user profile data into a plurality of first encrypted identifiers representing anonymization of the first user profile data for each respective first user;
receive marketing data associated with a second entity, the marketing data comprising at least a plurality of second encrypted identifiers representing anonymization of second user profile data for each of a plurality of second users associated with the second entity,
wherein the plurality of second encrypted identifiers were encrypted using the same particular encryption technique, such that particular users included in both the plurality of first users and the plurality of second users are associated with identical encrypted identifiers;
identify a plurality of matching users based at least in part on locating identical encrypted identifiers from among the first encrypted identifiers and the second encrypted identifiers; and
generate supplemental market segment data including, for each of the plurality of matching users:
(1) a user identifier; and
(2) market segment data associated with each user, wherein the market segment data is from the received marketing data associated with the second entity.

2. The system of claim 1, wherein the one or more hardware computing devices are further configured to:
provide the supplemental market segment data to an advertising computing system for use in targeted advertising.

3. The system of claim 1, wherein the one or more hardware computing devices are further configured to:
purge the first encrypted identifiers and the second encrypted identifiers after the supplemental market segment data is generated.

4. The system of claim 1, wherein the received marketing data associated with the second entity further comprises matching criteria, and wherein at least some of the plurality of matching users are identified based at least in part on the matching criteria.

5. The system of claim 1, wherein the first entity is a content publisher and the second entity is an advertiser.

6. The system of claim 1, wherein the one or more hardware computing devices are further configured to:
provide the plurality of first encrypted identifiers to a marketing bureau server configured to:
match the plurality of first encrypted identifiers with consolidated market segment data that comprises at least anonymized user profile data associated with respective encrypted identifiers received from the first entity and/or the second entity; and
periodically distribute the consolidated market segment data to the first entity and/or the second entity.

7. The system of claim 6, wherein the marketing data associated with the second entity is received from the marketing bureau server.

8. The system of claim 1, wherein the market segment data associated with the plurality of second users is encrypted using the particular encryption technique.

9. The system of claim 1, wherein the particular encryption technique is a cryptographic hash function.

10. The system of claim 1, wherein the first user profile data comprises names and addresses associated with the plurality of first users.

11. A computer-implemented method for anonymously sharing user profile data among a plurality of entities, the method comprising:
under control of a computing device configured with specific computer-executable instructions:
accessing first user profile data for each of a plurality of first users associated with a first entity;
encrypting, using a particular encryption technique, at least some of the first user profile data into a plurality of first encrypted identifiers representing anonymization of the first user profile data for each respective first user;
receiving marketing data associated with a second entity, the marketing data comprising at least a plurality of second encrypted identifiers representing anonymization of second user profile data for each of a plurality of second users associated with the second entity,
wherein the plurality of second encrypted identifiers were encrypted using the same particular encryption technique, such that particular users included in both the plurality of first users and the plurality of second users are associated with identical encrypted identifiers;
identifying a plurality of matching users based at least in part on locating identical encrypted identifiers from among the first encrypted identifiers and the second encrypted identifiers; and
generating supplemental market segment data including, for each of the plurality of matching users:
(1) a user identifier; and
(2) market segment data associated with each user, wherein the market segment data is from the received marketing data associated with the second entity.

12. The method of claim 11, further comprising:
providing the supplemental market segment data to an advertising computing system for use in targeted advertising.

13. The method of claim 11, further comprising:
purging the first encrypted identifiers and the second encrypted identifiers after the supplemental market segment data is generated.

14. The method of claim 11, wherein the received marketing data associated with the second entity further comprises matching criteria, and wherein at least some of the plurality of matching users are identified based at least in part on the matching criteria.

15. The method of claim 11, wherein the first entity is a content publisher and the second entity is an advertiser.

16. Non-transitory computer storage having stored thereon a computer program, the computer program including executable instructions that instruct a computer system to at least:
access first user profile data for each of a plurality of first users associated with a first entity;
encrypt, using a particular encryption technique, at least some of the first user profile data into a plurality of first encrypted identifiers representing anonymization of the first user profile data for each respective first user;
receive marketing data associated with a second entity, the marketing data comprising at least a plurality of second encrypted identifiers representing anonymization of second user profile data for each of a plurality of second users associated with the second entity,
wherein the plurality of second encrypted identifiers were encrypted using the same particular encryption technique, such that particular users included in both the plurality of first users and the plurality of second users are associated with identical encrypted identifiers;
identify a plurality of matching users based at least in part on locating identical encrypted identifiers from among the first encrypted identifiers and the second encrypted identifiers; and
generate supplemental market segment data including, for each of the plurality of matching users:

(1) a user identifier; and (2) market segment data associated with each user, wherein the market segment data is from the received marketing data associated with the second entity.

17. The non-transitory computer storage of claim 16, wherein the executable instructions further instruct the computer system to at least:

provide the plurality of first encrypted identifiers to a marketing bureau server configured to:

match the plurality of first encrypted identifiers with consolidated market segment data that comprises at least anonymized user profile data associated with respective encrypted identifiers received from the first entity and/or the second entity; and periodically distribute the consolidated market segment data to the first entity and/or the second entity.

18. The non-transitory computer storage of claim 16, wherein the market segment data associated with the plurality of second users is encrypted using the particular encryption technique.

19. The non-transitory computer storage of claim 16, wherein the particular encryption technique is a cryptographic hash function.

20. The non-transitory computer storage of claim 16, wherein the first user profile data comprises names and addresses associated with the plurality of first users.

* * * * *